US012633814B2

(12) United States Patent
Li et al.

(10) Patent No.: US 12,633,814 B2
(45) Date of Patent: May 19, 2026

(54) CONTROLLER FOR CONTROLLING PHASE-SHIFTED FULL-BRIDGE CIRCUIT, POWER SUPPLY MODULE, AND ELECTRONIC DEVICE

(71) Applicant: Huawei Digital Power Technologies Co., Ltd., Shenzhen (CN)

(72) Inventors: Yuan Li, Xi'an (CN); Xiao Zhang, Xi'an (CN); Xiaoye Tian, Xi'an (CN); Weijing Gong, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 491 days.

(21) Appl. No.: 18/299,816

(22) Filed: Apr. 13, 2023

(65) Prior Publication Data

US 2023/0353034 A1 Nov. 2, 2023

(30) Foreign Application Priority Data

Apr. 28, 2022 (CN) .......................... 202210461839.X

(51) Int. Cl.
H02M 1/00 (2007.01)
H02M 3/335 (2006.01)

(52) U.S. Cl.
CPC ..... H02M 1/0043 (2021.05); H02M 3/33573 (2021.05); H02M 3/33592 (2013.01)

(58) Field of Classification Search
CPC ............. H02M 1/0043; H02M 1/0032; H02M 1/0058; H02M 3/33573; H02M 3/33592; H02M 3/33576; H02M 3/01
See application file for complete search history.

(56) References Cited

U.S. PATENT DOCUMENTS 9,083,249 B2 * 7/2015 Yan ...................... H02M 3/3376
11,616,454 B2 * 3/2023 Muto ................ H02M 7/53878
363/98

(Continued)

FOREIGN PATENT DOCUMENTS

CN 201490890 U * 5/2010
TW 1712254 B * 12/2020

OTHER PUBLICATIONS

Yen-Shin Lai et al: "New thermal balance control techniques of phase Â-shift full-bridge converter", Energy Conversion Congress and Exposition (ECCE), 2012 IEEE, IEEE, Sep. 15, 2012 (Sep. 15, 2012), pp. 3975-3980 (Year: 2012).*

(Continued)

*Primary Examiner* — Thienvu V Tran
*Assistant Examiner* — Yahveh Comas Torres
(74) *Attorney, Agent, or Firm* — Maier & Maier, PLLC

(57) ABSTRACT

A controller for controlling a phase-shifted full-bridge circuit, a power supply module, and an electronic device. The phase-shifted full-bridge circuit includes a first leg and a second leg. A working state of the phase-shifted full-bridge circuit includes a first working state and a second working state. The controller is configured to: detect a load level of a load circuit coupled to the phase-shifted full-bridge circuit, and control, based on the load level, the phase-shifted full-bridge circuit to switch the running working state. When the phase-shifted full-bridge circuit runs in the first working state, the first leg is a leading leg, and the second leg is a lagging leg. When the phase-shifted full-bridge circuit runs in the second working state, the first leg is a lagging leg, and the second leg is a leading leg.

13 Claims, 10 Drawing Sheets

(56)                References Cited

U.S. PATENT DOCUMENTS

| | | | | |
|---|---|---|---|---|
| 2012/0248874 | A1* | 10/2012 | Pan | H02J 11/00 |
| | | | | 307/64 |
| 2013/0033904 | A1* | 2/2013 | Ye | H02M 3/33576 |
| | | | | 363/17 |
| 2014/0092634 | A1* | 4/2014 | Yan | H02M 3/33507 |
| | | | | 363/17 |
| 2019/0372468 | A1* | 12/2019 | Yu | H02M 3/33515 |
| 2022/0345053 | A1* | 10/2022 | Muto | H02M 1/0043 |

OTHER PUBLICATIONS

Mihalache L: "A modified pwm control technique for full bridge ZVS DCÂ-DC converter with equal losses for all devices", vol. 3, Oct. 3, 2004 (pp. 1776-1781) (Year: 2014).*
Machine translation CN_201490890 (Year: 2014).*
Machine translation TW_1712254 (Year: 2020).*

\* cited by examiner

Processing unit 501

Storage unit 502

CONTROLLER FOR CONTROLLING PHASE-SHIFTED FULL-BRIDGE CIRCUIT, POWER SUPPLY MODULE, AND ELECTRONIC DEVICE

CROSS-REFERENCE TO RELATED APPLICATION

This application claims priority to Chinese Patent Application No. 202210461839.X, filed on Apr. 28, 2022, which is hereby incorporated by reference in its entirety.

TECHNICAL FIELD

The embodiments relate to the field of electronic technologies, a controller for controlling a phase-shifted full-bridge circuit, a power supply module, and an electronic device.

BACKGROUND

FIG. 1 shows a topology structure of a phase-shifted full-bridge (PSFB) converter. A primary-side circuit of the PSFB converter may include two legs, which are denoted as a first leg and a second leg. The first leg and the second leg each include two switches, and the two switches are connected in series between a positive electrode and a negative electrode of a direct current power supply. A connection point of the two switches in each leg may be denoted as a middle point of the leg. The primary-side circuit may further include a primary-side coil. A first terminal of the primary-side coil is coupled to a middle point of the first leg, and a second terminal of the primary-side coil is coupled to a middle point of the second leg.

When a voltage at the first terminal of the primary-side coil changes from negative to positive, a leg at which a switch that is turned on first is located is denoted as a leading leg, and the other leg is denoted as a lagging leg. In an existing method for controlling the PSFB converter, the first leg is a leading leg, and the second leg is a lagging leg. When load on a secondary side of the PSFB converter is a heavy load, both the leading leg and the lagging leg may implement soft switching, but a primary side loss may be large. When the load on the secondary side of the PSFB converter is a light load, the lagging leg fails to implement soft switching. Consequently, the existing method is difficult to apply to a high switching frequency scenario.

SUMMARY

The embodiments may provide a controller for controlling a phase-shifted full-bridge circuit, a power supply module, and an electronic device, so that a loss is small in a full load range without adding an additional component.

According to a first aspect, an embodiment may provide a controller for controlling a phase-shifted full-bridge circuit. The phase-shifted full-bridge circuit includes a first leg and a second leg. The first leg includes a first high-side switch and a first low-side switch, and the second leg includes a second high-side switch and a second low-side switch. A working state of the phase-shifted full-bridge circuit includes a first working state and a second working state. In the first working state, the first leg is a leading leg, and the second leg is a lagging leg. In the second working state, the first leg is a lagging leg, and the second leg is a leading leg. The controller may detect a load level of a load circuit coupled to the phase-shifted full-bridge circuit. The controller may control, based on the load level, the phase-shifted full-bridge circuit to switch the running working state, that is, switch the working state of the phase-shifted full-bridge circuit.

In this embodiment, the controller may control the phase-shifted full-bridge circuit to run in the first working state or the second working state. The controller may determine the load level of the load circuit coupled to the phase-shifted full-bridge circuit, to adjust or switch the working state of the phase-shifted full-bridge circuit. The phase-shifted full-bridge circuit may support a load circuit with a heavy load level and a load circuit with a light load level in high efficiency and a low circuit loss. Therefore, the phase-shifted full-bridge circuit can support a full load range. For example, when the load level of the load circuit is a heavy load, the controller may control the phase-shifted full-bridge circuit to run in the first working state, to implement soft switching of each leg. For another example, when the load level of the load circuit is a light load, the phase-shifted full-bridge circuit is controlled to run in the second working state, to implement soft switching of each leg, improve a soft switching range, and reduce a circuit loss. The controller may control the phase-shifted full-bridge circuit in a manner in which no additional component needs to be added to the phase-shifted full-bridge circuit. This can implement soft switching in a full load range with a low loss and high application flexibility.

When the load level is a heavy load, and a current working state of the phase-shifted full-bridge circuit is the second working state, the controller switches the working state of the phase-shifted full-bridge circuit to the first working state, to implement soft switching of each leg. If the load level is a light load, and a current working state of the phase-shifted full-bridge circuit is the first working state, the controller switches the working state of the phase-shifted full-bridge circuit to the second working state, to implement soft switching of each leg, improve a soft switching range, and reduce a circuit loss.

The controller may represent the load level of the load circuit by using a detected current, voltage, power, and the like. The following uses an example in which the controller represents the load level of the load circuit by using a current. When detecting the load level of the load circuit coupled to the phase-shifted full-bridge circuit, the controller may detect an output current of the phase-shifted full-bridge circuit, to improve control effect. When detecting the load level of the load circuit coupled to the phase-shifted full-bridge circuit, the controller may detect a current of a primary-side winding of a converter in the phase-shifted full-bridge circuit. The controller may obtain the output current of the phase-shifted full-bridge circuit through calculation by using the current of the primary-side winding in a preset calculation manner. Alternatively, the controller determines, based on a load level signal provided by the load circuit, load of the phase-shifted full-bridge circuit.

The load level may be detected based on a comparison result between the output current of the phase-shifted full-bridge circuit and a first current threshold or a second current threshold, and the second current threshold is greater than the first current threshold. In response to that the output current is less than or equal to the preset first current threshold, and the load level detected by the controller is a light load, the controller controls the phase-shifted full-bridge circuit to run in the second working state. In response to that the output current is greater than or equal to the preset second current threshold, and the load level detected by the controller is a heavy load, the controller controls the phase-shifted full-bridge circuit to run in the first working state.

In this embodiment, if the controller determines that the output current is less than or equal to the preset first current threshold, the controller controls the phase-shifted full-bridge circuit to run in the second working state. For example, if the output current is less than or equal to the preset first current threshold, and the current working state of the phase-shifted full-bridge circuit is the first working state, the current working state of the phase-shifted full-bridge circuit is switched to the second working state. If the controller determines that the output current is greater than or equal to the preset second current threshold, the controller controls the phase-shifted full-bridge circuit to run in the first working state. For example, if the output current is greater than or equal to the preset second current threshold, and the current working state of the phase-shifted full-bridge circuit is the second working state, the current working state of the phase-shifted full-bridge circuit is switched to the first working state. The second current threshold is greater than the first current threshold. The controller may switch the working state of the phase-shifted full-bridge circuit based on a relationship between the detected output current and the first current threshold or the second current threshold. If the second current threshold is greater than the first current threshold, frequent switching of the working state of the phase-shifted full-bridge circuit can be avoided.

When the output current is greater than the first current threshold, and the output current is less than the second current threshold, the controller may control the phase-shifted full-bridge circuit to run in the first working state or the second working state. If the output current is greater than the first current threshold, and the output current is less than the second current threshold, the controller may control the phase-shifted full-bridge circuit to run in the current working state, to avoid frequent switching, and reduce a circuit loss.

When controlling the phase-shifted full-bridge circuit to switch the working state, the controller stops sending turn-on drive signals to the first high-side switch, the first low-side switch, the second high-side switch, and the second low-side switch, so that the phase-shifted full-bridge circuit stops running in the current working state; and after preset duration, sends the turn-on drive signals to the first high-side switch, the first low-side switch, the second high-side switch, and the second low-side switch based on a working state after switching. This may reduce an unstable output of the phase-shifted full-bridge circuit due to switching of the working state.

The controller may adjust a phase angle and a sequence between the turn-on drive signals sent to the first high-side switch and the second low-side switch and may adjust a phase angle and a sequence between the turn-on drive signals sent to the first low-side switch and the second high-side switch, to control the phase-shifted full-bridge circuit to switch the working state.

The drive signal sent by the controller to the switch may include a turn-on level and a turn-off level. The switch is in an on state under drive of the turn-on level, and the switch is in an off state under drive of the turn-off level. In the drive signals sent by the controller, a part whose level is the turn-on level is denoted as a turn-on drive signal, and a part whose level is the turn-off level may be denoted as a turn-off drive signal. In some scenarios, the controller may drive the switch to be off without providing a level to the switch. In the drive signal of the switch, a moment (or a short period of time) when a level of a signal is switched from the turn-off level to the turn-on level may be referred to as a rising edge of the signal. A moment (or a short period of time) when the level of the signal is switched from the turn-on level to the turn-off level may be referred to as a falling edge of the signal. Duration in which the switch is turned on under drive of the turn-on level and continuously maintains an on state may be denoted as turn-on duration of the switch. An interval may mean a part between a first moment and a second moment.

In this embodiment, the phase angle between the turn-on drive signal of the first high-side switch and the turn-on drive signal of the second low-side switch is also a phase difference between a phase corresponding to a rising edge of the drive signal of the first high-side switch and a phase corresponding to a rising edge of the drive signal of the second low-side switch. Similarly, the phase angle between the turn-on drive signal of the first low-side switch and the turn-on drive signal of the second high-side switch is also a phase difference between a phase corresponding to a rising edge of the drive signal of the first low-side switch and a phase corresponding to a rising edge of the drive signal of the second high-side switch. A sequence in which the controller sends the drive signals is fixed. The controller first sends the drive signal to the first high-side switch, and then sends the drive signal to the second low-side switch. The controller first sends the drive signal to the first low-side switch, and then sends the drive signal to the second high-side switch.

The controller may be configured to: adjust the phase angle to be greater than 0° and less than or equal to 180° and control the first high-side switch to be turned on before the second low-side switch, and the second high-side switch to be turned on before the first low-side switch, so that the phase-shifted full-bridge circuit runs in the first working state. Alternatively, the controller may control the first high-side switch to be turned on after the second low-side switch, and the second high-side switch to be turned on after the first low-side switch, so that the phase-shifted full-bridge circuit runs in the second working state.

The controller may be configured to: adjust the phase angle to be greater than 180° and less than or equal to 360°, and control the first high-side switch to be turned on before the second low-side switch, and the second high-side switch to be turned on before the first low-side switch, so that the phase-shifted full-bridge circuit runs in the second working state; or control the first high-side switch to be turned on after the second low-side switch, and the second high-side switch to be turned on after the first low-side switch, so that the phase-shifted full-bridge circuit runs in the first working state.

In some examples, the controller may adjust the phase shift angle in a preset angle range and may adjust a sequence to turn on the first high-side switch and the second low-side switch and a sequence to turn on the first low-side switch and the second high-side switch, to adjust the working state of the phase-shifted full-bridge circuit. For example, the controller adjusts the phase angle in a phase angle range (0°, 180°), and controls the first high-side switch to be turned on before the second low-side switch, and the second high-side switch to be turned on before the first low-side switch, to control the phase-shifted full-bridge circuit to run in the first working state. Alternatively, the controller may control the first high-side switch to be turned on after the second low-side switch, and the second high-side switch to be turned on after the first low-side switch, so that the phase-shifted full-bridge circuit runs in the second working state.

For example, the turn-on drive signal is provided to the first high-side switch, and after first duration, the turn-on drive signal is provided to the second low-side switch. In one period, a first phase angle corresponding to the first duration is greater than 0°, and the first phase angle is less than or equal to 180°. The turn-on drive signal is provided to the first low-side switch, and after the first duration, the turn-on drive signal is provided to the second high-side switch. In addition, the first high-side switch and the first low-side switch are not turned on at the same time, and the second high-side switch and the second low-side switch are not turned on at the same time.

Similarly, the controller may adjust the phase angle in a preset angle range and may adjust a sequence to turn on the first high-side switch and the second low-side switch and a sequence to turn on the first low-side switch and the second high-side switch, to adjust the working state of the phase-shifted full-bridge circuit. For example, the controller adjusts the phase angle in a phase angle range (180°, 360°), and controls the first high-side switch to be turned on before the second low-side switch, and the second high-side switch to be turned on before the first low-side switch, to control the phase-shifted full-bridge circuit to run in the second working state. Alternatively, the controller may control the first high-side switch to be turned on after the second low-side switch, and the second high-side switch to be turned on after the first low-side switch, so that the phase-shifted full-bridge circuit runs in the first working state.

In some other examples, the controller may control a preset sequence to turn on the first high-side switch and the second low-side switch and a preset sequence to turn on the first low-side switch and the second high-side switch, and adjust the phase angle, to adjust the working state of the phase-shifted full-bridge circuit.

For example, the controller controls the first high-side switch to be turned on before the second low-side switch, and the second high-side switch to be turned on before the first low-side switch. In this case, the controller adjusts the phase angle to be greater than 0° and less than or equal to 180°, so that the phase-shifted full-bridge circuit runs in the first working state. The controller adjusts the phase angle to be greater than 180° and less than or equal to 360°, so that the phase-shifted full-bridge circuit runs in the second working state.

For another example, the controller controls the first high-side switch to be turned on after the second low-side switch, and the second high-side switch to be turned on after the first low-side switch. In this case, the controller adjusts the phase angle to be greater than 0° and less than or equal to 180°, so that the phase-shifted full-bridge circuit runs in the second working state. The controller adjusts the phase angle to be greater than 180° and less than or equal to 360°, so that the phase-shifted full-bridge circuit runs in the first working state.

When the controller starts the phase-shifted full-bridge circuit, the phase-shifted full-bridge circuit runs in the first working state or the second working state. For example, when the controller starts the phase-shifted full-bridge circuit to provide electric energy to the load circuit, the controller may control the phase-shifted full-bridge circuit to run in the second working state. For another example, when the controller starts the phase-shifted full-bridge circuit to provide electric energy to the load circuit, the controller may control the phase-shifted full-bridge circuit to run in the first working state. The phase-shifted full-bridge circuit may implement a soft start. In other words, when the phase-shifted full bridge is started, soft switching is ensured.

According to a second aspect, an embodiment may further provide a method for controlling a phase-shifted full-bridge circuit. The phase-shifted full-bridge circuit includes a first leg and a second leg, the first leg includes a first high-side switch and a first low-side switch, and the second leg includes a second high-side switch and a second low-side switch. The method may be performed or implemented by a controller or a control apparatus. The following uses an example in which the controller implements the method. The method may include: The controller detects a load level of a load circuit coupled to the phase-shifted full-bridge circuit, and control, based on the load level, the phase-shifted full-bridge circuit to switch the running working state. When the phase-shifted full-bridge circuit runs in a first working state, the first leg is a leading leg, and the second leg is a lagging leg. When the phase-shifted full-bridge circuit runs in a second working state, the first leg is the lagging leg, and the second leg is the leading leg.

Switching a working state of the phase-shifted full-bridge circuit based on the load level may include: If the load level is a heavy load, and a current working state of the phase-shifted full-bridge circuit is the second working state, the controller switches the working state of the phase-shifted full-bridge circuit to the first working state. If the load level is a light load, and a current working state of the phase-shifted full-bridge circuit is the first working state, the controller switches the working state of the phase-shifted full-bridge circuit to the second working state.

When detecting the load level of the load circuit coupled to the phase-shifted full-bridge circuit, the controller may detect an output current of the phase-shifted full-bridge circuit or detect a current of a primary-side winding of a converter in the phase-shifted full-bridge circuit; or determine, based on a load level signal provided by the load circuit, load of the phase-shifted full-bridge circuit.

The controller may detect the load level based on a comparison result between the output current of the phase-shifted full-bridge circuit and a first current threshold or a second current threshold, and the second current threshold is greater than the first current threshold. In response to that the output current is less than or equal to the preset first current threshold, and the load level detected by the controller is a light load, the controller controls the phase-shifted full-bridge circuit to run in the second working state. In response to that the output current is greater than or equal to the preset second current threshold, and the load level detected by the controller is a heavy load, the controller controls the phase-shifted full-bridge circuit to run in the first working state.

When the output current is greater than the first current threshold, and the output current is less than the second current threshold, the controller controls the phase-shifted full-bridge circuit to run in the current working state.

The load level may be detected based on a comparison result between the output current of the phase-shifted full-bridge circuit and a first current threshold or a second current threshold, and the second current threshold is greater than the first current threshold. In response to that the output current is less than or equal to the preset first current threshold, it may indicate that the load level is a light load, and the controller controls the phase-shifted full-bridge circuit to run in the second working state. In response to that the output current is greater than or equal to the preset second current threshold, it may indicate that the load level is a heavy load, and the controller controls the phase-shifted full-bridge circuit to run in the first working state.

When controlling the phase-shifted full-bridge circuit to switch the working state, the controller may stop sending turn-on drive signals to the first high-side switch, the first low-side switch, the second high-side switch, and the second low-side switch, so that the phase-shifted full-bridge circuit stops running in the current working state; and after preset duration, send the turn-on drive signals to the first high-side switch, the first low-side switch, the second high-side switch, and the second low-side switch based on a working state after switching.

When controlling the phase-shifted full-bridge circuit to switch the working state, the controller may adjust a phase angle and a sequence between the turn-on drive signals sent to the first high-side switch and the second low-side switch, and adjust a phase angle and a sequence between the turn-on drive signals sent to the first low-side switch and the second high-side switch.

The controller may adjust the phase angle to be greater than 0° and less than or equal to 180°, and control the first high-side switch to be turned on before the second low-side switch, and the second high-side switch to be turned on before the first low-side switch, so that the phase-shifted full-bridge circuit runs in the first working state; or control the first high-side switch to be turned on after the second low-side switch, and the second high-side switch to be turned on after the first low-side switch, so that the phase-shifted full-bridge circuit runs in the second working state.

The controller may adjust the phase angle to be greater than 180° and less than or equal to 360°, and control the first high-side switch to be turned on before the second low-side switch, and the second high-side switch to be turned on before the first low-side switch, so that the phase-shifted full-bridge circuit runs in the second working state; or control the first high-side switch to be turned on after the second low-side switch, and the second high-side switch to be turned on after the first low-side switch, so that the phase-shifted full-bridge circuit runs in the first working state.

According to a third aspect, an embodiment may further provide a controller or a control apparatus, including a processor and a memory coupled to the processor. The processor invokes program code stored in the memory, to perform the method in the second aspect.

According to a fourth aspect, an embodiment may further provide a non-transitory computer-readable storage medium. The non-transitory computer-readable storage medium stores a computer program, and when the computer program is executed by a computer, the computer is enabled to perform the method in the second aspect.

According to a fifth aspect, an embodiment may further provide a power supply module, including a phase-shifted full-bridge circuit and a controller. The phase-shifted full-bridge circuit includes a first leg and a second leg, the first leg includes a first high-side switch and a first low-side switch, the second leg includes a second high-side switch and a second low-side switch, and the controller is configured to control the phase-shifted full-bridge circuit to supply power to a load circuit of the power supply module. A working state of the phase-shifted full-bridge circuit includes a first working state and a second working state, when the phase-shifted full-bridge circuit runs in the first working state, the first leg is a leading leg, and the second leg is a lagging leg; or when the phase-shifted full-bridge circuit runs in the second working state, the first leg is a lagging leg, and the second leg is a leading leg. The controller is configured to control, based on a load level of the load circuit, the phase-shifted full-bridge circuit to switch a working state. The controller includes: a detection terminal, where the detection terminal is configured to detect the load level of the load circuit; and a drive terminal, where the drive terminal is configured to send turn-on drive signals to the first high-side switch and the first low-side switch of the first leg, and the second high-side switch and the second low-side switch of the second leg. The controller is configured to adjust, based on the load level detected by the detection terminal, the drive signals output by the drive terminal, to control the phase-shifted full-bridge circuit to run in the first working state or the second working state.

When adjusting, based on the load level detected by the detection terminal, the drive signals output by the drive terminal, the controller may be configured to: adjust a phase angle between the turn-on drive signals sent by the drive terminal to the first high-side switch and the second low-side switch; and adjust a phase angle between the turn-on drive signals sent by the drive terminal to the first low-side switch and the second high-side switch. When the phase angle is greater than 0° and less than or equal to 180°, the phase-shifted full-bridge circuit runs in the first working state. When the phase angle is greater than 180° and less than or equal to 360°, the phase-shifted full-bridge circuit runs in the second working state.

When detecting the load level of the load circuit, the detection terminal of the controller may be configured to: detect the load level based on a comparison result between an output current of the phase-shifted full-bridge circuit and a first current threshold or a second current threshold, and the second current threshold is greater than the first current threshold. When the output current is less than or equal to the preset first current threshold may indicate that the load level is a light load. When the output current is greater than or equal to the preset second current threshold may indicate that the load level is a heavy load.

When controlling the phase-shifted full-bridge circuit to switch the working state, the controller may be configured to: adjust a phase angle and a sequence between the turn-on drive signals sent to the first high-side switch and the second low-side switch, and adjust a phase angle and a sequence between the turn-on drive signals sent to the first low-side switch and the second high-side switch.

The controller may adjust the phase angle to be greater than 0° and less than or equal to 180°, and may control the first high-side switch to be turned on before the second low-side switch, and the second high-side switch to be turned on before the first low-side switch, so that the phase-shifted full-bridge circuit runs in the first working state; or may adjust the phase angle to be greater than 0° and less than or equal to 180°, and may control the first high-side switch to be turned on after the second low-side switch, and the second high-side switch to be turned on after the first low-side switch, so that the phase-shifted full-bridge circuit runs in the second working state.

The controller may adjust the phase angle to be greater than 180° and less than or equal to 360°, and may control the first high-side switch to be turned on before the second low-side switch, and the second high-side switch to be turned on before the first low-side switch, so that the phase-shifted full-bridge circuit runs in the second working state; or may adjust the phase angle to be greater than 180° and less than or equal to 360°, and may control the first high-side switch to be turned on after the second low-side switch, and the second high-side switch to be turned on after the first low-side switch, so that the phase-shifted full-bridge circuit runs in the first working state.

When controlling the phase-shifted full-bridge circuit to switch the working state, the controller may be configured to: stop sending the turn-on drive signals to the first high-side switch, the first low-side switch, the second high-side switch, and the second low-side switch; and after preset duration, send the turn-on drive signals to the first high-side switch, the first low-side switch, the second high-side switch, and the second low-side switch based on a working state after switching.

According to a sixth aspect, an embodiment may further provide an electronic device, including the controller in the first aspect or the power supply module in the fifth aspect.

For effects achieved by the second aspect to the sixth aspect, refer to effects achieved by the first aspect. Details are not described again.

DETAILED DESCRIPTION OF THE EMBODIMENTS

Figure 1:
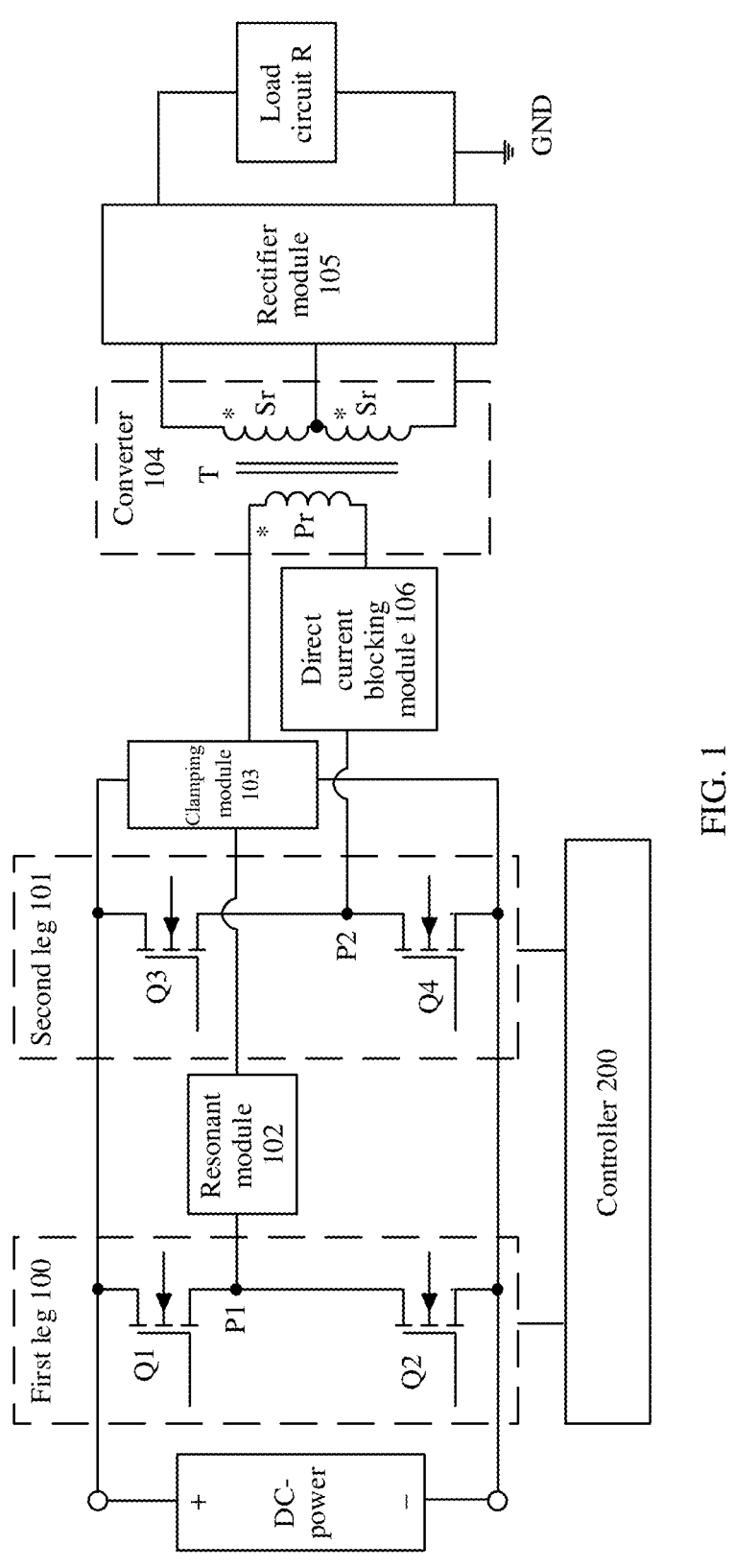
FIG. 1 is a schematic diagram of a structure of a phase-shifted full-bridge circuit.

To make objectives, solutions, and advantages clearer, the following further describes in detail the embodiments with reference to the accompanying drawings. An operation in the method embodiments may also be applied to an apparatus embodiment or a system embodiment. It should be noted that, "at least one" means one or more, and "a plurality of" means two or more. In view of this, "a plurality of" may also be understood as "at least two" in the embodiments. The term "and/or" describes an association relationship for describing associated objects and represents that three relationships may exist. For example, A and/or B may represent the following three cases: only A exists, both A and B exist, and only B exists. In addition, the character "/", unless otherwise specified, may indicate an "or" relationship between the associated objects. In addition, it should be understood that terms such as "first" and "second" are merely used for differentiation and description but should not be understood as an indication or implication of relative importance or an indication or implication of a sequence.

It should be noted that "coupling" may be understood as electric connection, and coupling between two electrical elements may be direct or indirect coupling between the two electrical elements. For example, connection between A and B may represent that A is directly coupled to B, or A is indirectly coupled to B by using one or more other electrical elements. For example, coupling between A and B may also represent that A is directly coupled to C, C is directly coupled to B, or A and B are coupled to each other by using C. In some scenarios, "coupling" may also be understood as connection. In conclusion, A is coupled to B, so that electric energy is transmitted between A and B.

It should be noted that a switch transistor and a switch may be one or more of a plurality of types of switch transistors, for example, a relay, a metal oxide semiconductor field effect transistor (MOSFET), a bipolar junction transistor (BJT), and an insulated gate bipolar transistor (IGBT), which are not enumerated one by one in the embodiments. Each switch transistor may include a first electrode, a second electrode, and a control electrode (or referred to as a control terminal). The control electrode is configured to control the switch transistor to be turned on or turned off. When the switch transistor is turned on, a current may be transmitted between the first electrode and the second electrode of the switch transistor. When the switch transistor is turned off, a current cannot be transmitted between the first electrode and the second electrode of the switch transistor. A MOSFET is used as an example. The control electrode of the switch transistor is a gate, the first electrode of the switch transistor may be a source of the switch transistor, and the second electrode may be a drain of the switch transistor. Alternatively, the first electrode may be a drain of the switch transistor, and the second electrode may be a source of the switch transistor.

The following describes the embodiments with reference to the accompanying drawings. An embodiment may provide a phase-shifted full-bridge circuit (topology). As shown in FIG. 1, the phase-shifted full-bridge circuit may include a first leg 100, a second leg 101, a resonant module 102, a clamping module 103, a converter 104, and a rectifier module 105.

The phase-shifted full-bridge circuit may include four switches. The first leg 100 includes two switches, and the second leg 102 includes the other two switches. Refer to FIG. 1. The first leg 100 includes a first high-side switch Q1 and a first low-side switch Q2 that are connected in series, and the second leg 101 includes a second high-side switch Q3 and a second low-side switch Q4 that are connected in series. The first leg 100 and the second leg 101 are connected in parallel between a positive connection terminal in+ and a negative connection terminal in−. The positive connection terminal in+ may be coupled to a positive electrode of a direct current power supply DC-power, and the negative connection terminal in− may be coupled to a negative electrode of the direct current power supply DC-power. A middle point P1 of the first leg 100 may be any point on a connection line between the first high-side switch Q1 and the first low-side switch Q2. A middle point P2 of the second leg 101 may be any point on a connection line between the second high-side switch Q3 and the second low-side switch Q4. In some examples, as shown in FIG. 1, the middle point P1 may be coupled to the positive connection terminal in+ by using the first high-side switch Q1, and to the negative connection terminal in− by using the first low-side switch Q2. The middle point P2 may be coupled to the positive connection terminal in+ by using the second high-side switch Q3, and to the negative connection terminal in− by using the second low-side switch Q4. In some other examples, the middle point P1 may be coupled to the positive connection terminal in+ by using the first low-side switch Q2, and to the negative connection terminal in− by using the first high-side switch Q1. The middle point P2 may be coupled to the positive connection terminal in+ by using the second low-side switch Q4, and to the negative connection terminal in− by using the second high-side switch Q3.

The middle point P1 of the first leg 100 may be coupled to a first terminal of the resonant module 102, a second terminal of the resonant module 102 may be coupled to a first terminal of the clamping module 103, and the first terminal of the clamping module 103 is coupled to a first terminal of a primary-side winding Pr of the converter 104. A second terminal of the clamping module 103 is coupled to the positive electrode of the direct current power supply DC-power, and a third terminal of the clamping module 103 is coupled to the negative electrode of the direct current power supply DC-power. A secondary-side winding Sr of the converter 104 is coupled to the rectifier module 105, and the rectifier module 105 is coupled to a load circuit R.

The resonant module 102 may be configured to implement soft switching of each switch of a lagging leg in a primary-side circuit. Soft switching may also be referred to as a soft switching technology, to turn on or turn off a switch when a voltage at two ends of the switch or a current flowing through the switch is zero (or nearly to zero). Soft switching can reduce a switch switching loss. The clamping module 103 may be configured to clamp a voltage at a rectifier diode of the rectifier module 105. The clamping module 103 may include a plurality of clamping switch transistors or clamping diodes. The rectifier module 105 may be configured to rectify electric energy output by the secondary-side winding, and then output the electric energy to the load circuit. The rectifier module 105 may include a full-wave rectifier circuit or a full-bridge rectifier circuit.

The primary-side circuit may include the first leg 100, the second leg 101, the resonant module 102, the clamping module 103, and the primary-side winding Pr of the converter 104. A secondary-side circuit may include the secondary-side winding Sr and the rectifier module 105. The converter 104 may include one or more secondary-side windings Sr. The primary-side circuit is coupled to the secondary-side circuit by using the converter 104, to provide electric energy to the secondary-side circuit. For example, the primary-side circuit may provide electric energy to at least one secondary-side circuit under control of the controller. The phase-shifted full-bridge circuit provided in this embodiment may be used in a direct current-direct current (DC-DC) conversion scenario. For example, the phase-shifted full-bridge circuit may serve as a charger for a power consumption device. In some examples, the power consumption device may be an electronic device, a household power consumption device, or the like. This is not limited in this embodiment.

An embodiment may further provide a controller 200 for controlling the phase-shifted full-bridge circuit. The controller 200 may control the first leg 100 and the second leg 101 and may convert direct current electric energy provided by the direct current (DC) power supply into alternating current (AC) electric energy. The converter 104 transmits the alternating current electric energy to the rectifier module 105. The rectifier module 105 may rectify the alternating current electric energy into direct current electric energy. In some scenarios, the phase-shifted full-bridge circuit may further include a direct current blocking module 106 for direct current blocking.

Figure 2:
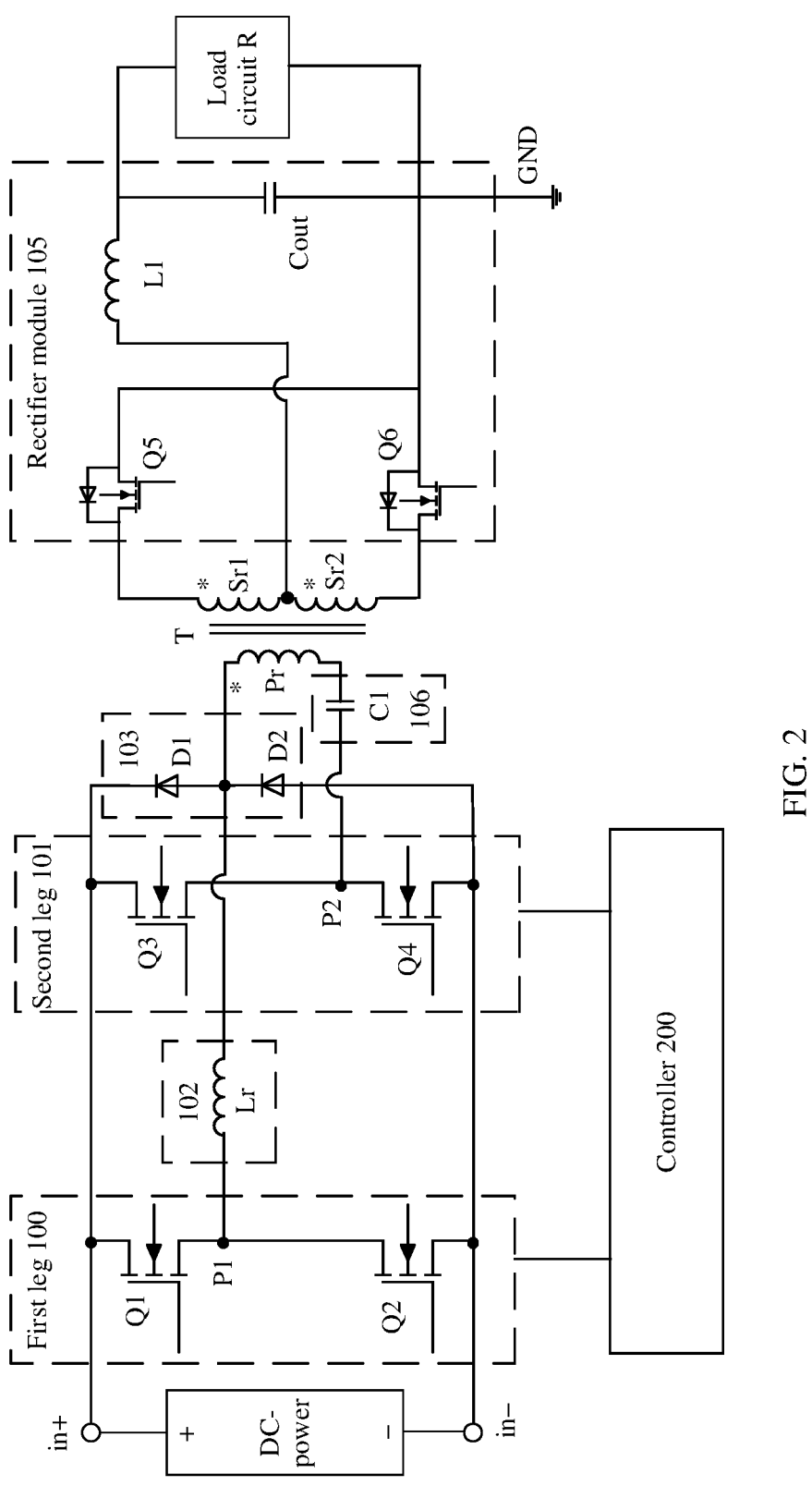
FIG. 2 is a schematic diagram of a structure of a phase-shifted full-bridge circuit.

In a possible implementation, as shown in FIG. 2, the clamping module 103 may include a plurality of clamping diodes, for example, a diode D1 and a diode D2. A cathode (which is also the second terminal of the clamping module 103) of the diode D1 is coupled to the positive electrode of the direct current power supply, and an anode (which is also the third terminal of the clamping module 103) of the diode D2 is coupled to the negative electrode of the direct current power supply. The first terminal of the primary-side coil Pr is separately coupled to an anode (which is also the first terminal of the clamping module 102) of the diode D1 and a cathode of the diode D2. The diode D1 and the diode D2 may be configured to clamp the voltage at the rectifier diode (for example, the rectifier diode or a rectifier switch transistor) of the rectifier module 105. The resonant module 102 may include a resonant inductor Lr, and the resonant inductor Lr may be disposed between the middle point P1 of the first leg 100 and the middle point P2 of the second leg 101. Refer to FIG. 2. One terminal (which is also the first terminal of the clamping module 102) of the resonant inductor Lr is coupled to the middle point P1, and the other terminal (which is also the second terminal of the clamping module 102) of the resonant inductor Lr may be coupled to the first terminal of the clamping module 103. In some examples, the phase-shifted full-bridge circuit may include the direct current blocking module 106, and the direct current blocking module 106 may include a capacitor C1. One electrode of the capacitor C1 is coupled to the middle point P2, and the other electrode is coupled to the second terminal of the primary-side winding Pr.

The rectifier module 105 of the phase-shifted full-bridge circuit may include a full-wave rectifier circuit, to convert an alternating current into a current in a single direction. The phase-shifted full-bridge circuit may include a plurality of secondary-side windings, for example, a secondary-side winding Sr1 and a secondary-side winding Sr2. In a high-current scenario, the rectifier module 105 may rectify, by using a synchronous rectification technology, a current received by a secondary-side coil Sr. FIG. 2 shows a full-wave rectifier circuit according to an example embodiment. The full-wave rectifier circuit may include a switch Q5 and a switch Q6. A first terminal of the secondary-side winding Sr1 is coupled to the ground (GND) by using the switch Q5, and a second terminal of the secondary-side winding Sr1 is coupled to the ground by using an inductor L1 and a capacitor Cout. In addition, the second terminal of the secondary-side winding Sr1 is coupled to a first terminal of the secondary-side winding Sr2, and a second terminal of the secondary-side winding Sr2 is coupled to the ground by using the switch Q6. The load circuit of the phase-shifted full-bridge circuit may be connected to the capacitor Cout in parallel. The controller 200 may control the switch Q5 and the switch Q6 to be turned on and turned off, to implement a function of the rectifier module 105. For example, in a positive half cycle of the alternating current, the switch Q5 is in an on state, the switch Q6 is in an off state, and the secondary-side winding Sr1, the inductor L1, the capacitor Cout, and the load circuit form a loop. Therefore, the rectifier module 105 outputs electric energy to the load circuit in the positive half cycle of the alternating current. In a negative half cycle of the alternating current, the switch Q5 is in an off state, the switch Q6 is in an on state, and the secondary-side winding Sr2, the inductor L1, the capacitor Cout, and the load circuit form a loop. Therefore, the rectifier module 105 outputs electric energy to the load circuit in the negative half cycle of the alternating current. It can be understood that the rectifier module 105 can output electric energy to the load circuit in the positive half cycle and the negative half cycle of the alternating current.

Figure 3:
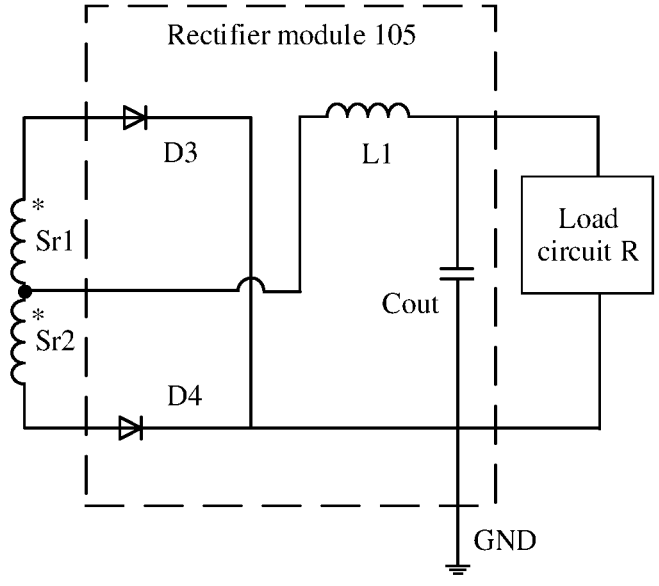
FIG. 3 is a schematic diagram of a structure of a rectifier module in a phase-shifted full-bridge circuit.

In a low-current scenario, the rectifier module 105 may rectify, by using a plurality of rectifier diodes, a current received by a secondary-side coil Sr. As shown in FIG. 3, the plurality of rectifier diodes may be separately denoted as a diode D3 and a diode D4. An anode of the diode D3 is coupled to the first terminal of the secondary-side winding Sr1, and a cathode of the diode D3 is coupled to the ground (GND). An anode of the diode D4 is coupled to the second terminal of the secondary-side winding Sr2, and a cathode of the diode D4 is coupled to the ground (GND). For example, in a positive half cycle of the alternating current, the diode D1 is in an on state, the diode D2 is in an off state, and the secondary-side winding Sr1, the inductor L1, the capacitor Cout, and the load circuit form a loop. Therefore, the rectifier module 105 outputs electric energy to the load circuit in the positive half cycle of the alternating current. In a negative half cycle of the alternating current, the diode D1 is in an off state, the diode D2 is in an on state, and the secondary-side winding Sr2, the inductor L1, the capacitor Cout, and the load circuit form a loop. Therefore, the rectifier module 105 outputs electric energy to the load circuit in the negative half cycle of the alternating current. Therefore, the rectifier module 105 can output electric energy to the load circuit in the positive half cycle and the negative half cycle of the alternating current.

In an actual application scenario, the phase-shifted full-bridge circuit may further include another module or component, to form a variant circuit of the phase-shifted full-bridge circuit. This is not limited in this embodiment and examples are not enumerated one by one.

In this embodiment, when a clamping voltage at the converter changes from negative to positive, a leg at which a switch that is turned on first is located is denoted as a leading leg, and the other leg is denoted as a lagging leg. The phase-shifted full-bridge circuit may include a plurality of working states, for example, a first working state and a second working state. The working state of the phase-shifted full-bridge circuit may be understood as working states of the first leg and the second leg. This is not distinguished in this embodiment. In the first working state, the first leg 100 is configured as a leading leg, and the second leg 101 is configured as a lagging leg. In the second working state, the second leg 101 is configured as a leading leg, and the first leg 100 is configured as a lagging leg.

A load level of the load circuit may include either a heavy load or a light load. In some examples, if the load level of the load circuit is greater than a preset load level, the load circuit may be referred to as a heavy load. If the load level of the load circuit is less than or equal to the preset load level, the load circuit may be referred to as a light load. The preset load level may be configured based on an actual application scenario.

The phase-shifted full-bridge circuit has a rated load level. In other examples, a ratio between the load level of the load circuit and the rated load level is less than a ratio threshold. It may indicate that the load level of the load circuit is a light load. The ratio between the load level of the load circuit and the rated load level is greater than or equal to the ratio threshold. It may indicate that the load level of the load circuit is a heavy load. In some application scenarios, the ratio threshold may be 0.3.

For the load circuit of the phase-shifted full-bridge circuit, soft switching may be implemented when the load level is a heavy load. However, when the load level is a light load, the lagging leg may fail to implement soft switching. Consequently, it is difficult to apply the phase-shifted full-bridge circuit at a high frequency. Table 1 shows a soft switching range (a switching frequency range that can implement soft switching) when a load of the phase-shifted full bridge circuit is light, a primary-side current (a current of the primary-side circuit) under a heavy load, a loss of the clamping diode, a circuit loss under a light load, and a circuit loss under a heavy load when the phase-shifted full bridge circuit is in different working states.

TABLE 1

|  | First working state | Second working state |
| --- | --- | --- |
| Soft switching range under a light load | Narrow | Wide |
| Primary-side current under a heavy load | Low | High |
| Loss of a clamping diode | Small | Large |
| Circuit loss under a light load | High | Low |
| Circuit loss under a heavy load | Low | High |

Figure 4:
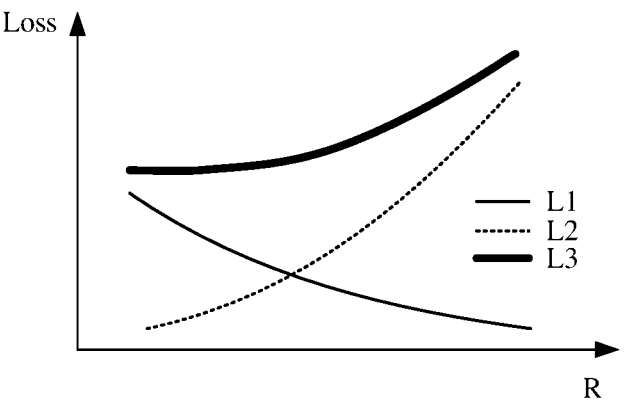
FIG. 4 is a schematic diagram of a relationship between load and a loss.

With reference to FIG. 4, the circuit loss includes a turn-on loss and a switching loss. For a relationship between the switching loss and the load, refer to a curve L1. For a relationship between the turn-on loss and the load (R), refer to a curve L2. For a relationship between a total loss and the load, refer to a curve L3. The relationship between the load and the turn-on loss may be that larger load indicates a larger turn-on loss. Smaller load indicates a smaller turn-on loss. The relationship between the load and the switching loss is that larger load indicates a smaller turn-on loss. Smaller load indicates a larger turn-on loss. The relationship between the load and the circuit loss is that larger load indicates a large circuit loss. A smaller load may indicate a smaller circuit loss.

When the phase-shifted full-bridge circuit runs in the first working state, the range of implementing soft switching in a full load range is narrow. In a high frequency and high power density application scenario, soft switching cannot be implemented under a light load, and the switching loss is large. When the phase-shifted full-bridge circuit runs in the second working state, a primary-side cross current loss is large and the turn-on loss is also large under a heavy load. Therefore, a requirement for a switch (or a diode) is high.

Figure 5:
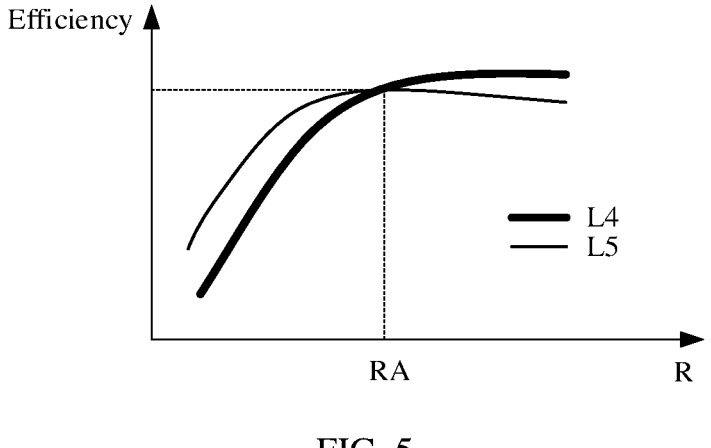
FIG. 5 is a schematic diagram of a relationship between load and efficiency.

In addition, FIG. 5 shows a relationship between load and efficiency of the phase-shifted full-bridge circuit when the phase-shifted full-bridge circuit runs in different working states. When the phase-shifted full-bridge circuit runs in the first working state, a curve L4 shows the relationship between the load and the efficiency. When the phase-shifted full-bridge circuit runs in the second working state, a curve L5 shows the relationship between the load and the efficiency. When the load is the same, and the load is less than RA, efficiency of the converter when the phase-shifted full-bridge circuit runs in the first working state is less than efficiency of the converter when the phase-shifted full-bridge circuit runs in the second working state.

It can be understood from the foregoing descriptions that, if the phase-shifted full-bridge circuit uses only one working state, it is difficult to implement high efficiency and soft switching when the phase-shifted full-bridge circuit either in a light load scenario or a heavy load scenario. In view of this, an embodiment may further provide a controller 200 for the phase-shifted full-bridge circuit, to improve application flexibility, and implement high efficiency.

The controller 200 provided in this embodiment may have a function of controlling the phase-shifted full-bridge circuit provided in this embodiment, or a function of controlling a variant circuit including the phase-shifted full-bridge circuit. The controller 200 may control the primary-side circuit. For example, the controller 200 may be coupled to the control terminal of the first high-side switch Q1 of the first leg 100 and to the control terminal of the first low-side switch Q2. The controller 200 may be coupled to the control terminal of the second high-side switch Q3 of the second leg 101 and to the control terminal of the second low-side switch Q4. In the phase-shifted full-bridge circuit, the first high-side switch Q1 and the second low-side switch Q4 may be referred to as a pair of transistors and the first low-side switch Q2 and the second high-side switch Q3 may be referred to as another pair of transistors. When any pair of transistors is turned on, energy can be transferred from the primary-side circuit to the secondary-side circuit.

In this embodiment, the controller 200 may switch, based on the load level of the load circuit coupled to the phase-shifted full-bridge circuit, the working state of the phase-shifted full-bridge circuit. The controller 200 may detect the load level of the load circuit coupled to the phase-shifted full-bridge circuit. Then, the controller adjusts, based on the detected load level of the load circuit, the working state of the phase-shifted full-bridge circuit. In some examples, the controller 200 may include a detection terminal (or a detection circuit), configured to detect the load level of the load circuit.

The controller 200 may use a plurality of manners to detect the load level of the load circuit. The controller 200 may represent the load level of the load circuit by using a detected current, voltage, power, and the like. This is not limited in this embodiment. In some examples, the controller 200 may determine the load level of the load circuit by collecting an output current of the phase-shifted full-bridge circuit or a current output by the rectifier module 105 to the load circuit. In some other examples, the controller 200 may obtain the output current of the phase-shifted full-bridge circuit or the current output by the rectifier module 105 to the load circuit through calculation by using the current or the voltage of the primary-side circuit and the current of the primary-side winding of the converter in a preset calculation manner. In still some examples, the controller 200 may receive information provided by the load circuit and may determine the load level of the load circuit based on the information provided by the load circuit. For example, the controller 200 may receive information (including, but not limited to, a current, a voltage, or power received by the load circuit) provided by the controller of the load circuit.

The controller 200 switches, based on the load level of the load circuit coupled to the phase-shifted full-bridge circuit, the working state of the phase-shifted full-bridge circuit. If the load level is a heavy load, and a current working state of the phase-shifted full-bridge circuit is the second working state, the controller 200 may switch the working state of the phase-shifted full-bridge circuit to the first working state, to reduce a circuit loss and a loss of the clamping diode. If the load level is a light load, and a current working state of the phase-shifted full-bridge circuit is the first working state, the controller 200 may switch the working state of the phase-shifted full-bridge circuit to the second working state, to reduce a circuit loss, and easily implement soft switching of the lagging leg.

The following uses an example in which the controller 200 represents, by using the detected current, the load level of the load circuit coupled to the phase-shifted full-bridge circuit. In some examples, the controller 200 may collect a current at any point on the connection line between the rectifier module 105 and the load circuit, to determine the load level of the load circuit. The controller 200 may represent, by using a current collected at a point, the load level of the load circuit coupled to the phase-shifted full-bridge circuit. In other words, the controller 200 may determine, by using the detected current, that the load level of the load circuit is a light load or a heavy load. For ease of description, the output current (which is also the current provided by the rectifier module 105 to the load circuit) of the phase-shifted full-bridge circuit collected by the controller 200 is denoted as a first current. Optionally, the controller 200 may collect the first current based on a preset collection period. The controller 200 may detect, by collecting the first current, the load level of the load circuit coupled to the phase-shifted full-bridge circuit. In some examples, when the first current is greater than a preset current threshold, the controller 200 may determine that the load level of the load circuit is a heavy load, to control the phase-shifted full-bridge circuit to run in the first working state. When the first current is less than or equal to the current threshold, the controller 200 may determine that the load level of the load circuit is a light load, to control the phase-shifted full-bridge circuit to run in the second working state.

The controller 200 may detect the load level based on a comparison result between the output current of the phase-shifted full-bridge circuit and a preset first current threshold or a preset second current threshold, where the second current threshold is greater than the first current threshold. The first current threshold and the second current threshold may be preconfigured in the controller 200. In some possible scenarios, the first current threshold may indicate a minimum current that can implement soft switching when the phase-shifted full-bridge circuit runs in the second working state. The second current threshold may indicate a current when electric energy efficiency of the phase-shifted full-bridge circuit running in the second working state is equal to electric energy efficiency of the phase-shifted full-bridge circuit running in the first working state.

For example, the comparison result is that the first current is less than or equal to the preset first current threshold. It may indicate that the load level is a light load. The controller 200 may control the phase-shifted full-bridge circuit to run in the second working state, in response to that the first current is less than or equal to the preset first current threshold.

The comparison result is that the first current is greater than or equal to the preset second current threshold. It may indicate that the load level is a heavy load. The controller 200 may control the phase-shifted full-bridge circuit to run in the first working state, in response to that the first current is greater than or equal to the preset second current threshold.

In some examples, when the first current is less than or equal to the preset first current threshold, the controller 200 may determine that the load level of the load circuit is a light load, to control the phase-shifted full-bridge circuit to run in the second working state. When the first current is greater than or equal to the preset second current threshold, the controller 200 may determine that the load level of the load circuit is a heavy load, to control the phase-shifted full-bridge circuit to run in the first working state. The second current threshold is greater than the first current threshold.

It can be understood from the foregoing descriptions that the controller 200 may determine that the load level of the load circuit is a heavy load, to control the phase-shifted full-bridge circuit to run in the first working state. The controller 200 may further determine that the load level of the load circuit is a light load, to control the phase-shifted full-bridge circuit to run in the second working state. This may implement soft switching of the phase-shifted full-bridge circuit, reduce a circuit loss, and improve efficiency of the phase-shifted full-bridge circuit.

In some possible cases, in response to that the first current is greater than the first current threshold, and the first current is less than the second current threshold, the controller 200 may control the phase-shifted full-bridge circuit to run in the first working state or the second working state.

For example, when the first current is greater than the first current threshold, the first current is less than the second current threshold, and the current working state of the phase-shifted full-bridge circuit is the first working state, the controller 200 may switch the working state of the phase-shifted full-bridge circuit to the second working state. In other words, the controller 200 may switch the working state of the phase-shifted full-bridge circuit.

For another example, when the first current is greater than the first current threshold, the first current is less than the second current threshold, and the current working state of the phase-shifted full-bridge circuit is the second working state, the controller 200 may switch the working state of the phase-shifted full-bridge circuit to the first working state. The second current threshold is greater than the first current threshold. In other words, the controller 200 may switch the working state of the phase-shifted full-bridge circuit.

Optionally, in response to that the first current is greater than the first current threshold, and the first current is less than the second current threshold, the controller 200 may not change the current working state of the phase-shifted full-bridge circuit and may control the phase-shifted full-bridge circuit to run in the current working state.

For example, when the first current is greater than the first current threshold, the first current is less than the second current threshold, and the current working state of the phase-shifted full-bridge circuit is the second working state, the controller 200 may control the phase-shifted full-bridge circuit to run in the current working state. In other words, the controller 200 may not change the working state of the phase-shifted full-bridge circuit.

For another example, when the first current is greater than the first current threshold, the first current is less than the second current threshold, and the current working state of the phase-shifted full-bridge circuit is the first working state, the controller 200 may control the phase-shifted full-bridge circuit to run in the current working state. In other words, the controller 200 may not change the working state of the phase-shifted full-bridge circuit.

It should be understood that when the current working state of the phase-shifted full-bridge circuit is the first working state, and the controller 200 switches the working state of the phase-shifted full-bridge circuit to the second working state, the working state of the phase-shifted full-bridge circuit is switched. Similarly, when the current working state of the phase-shifted full-bridge circuit is the first working state, and the controller 200 switches the working state of the phase-shifted full-bridge circuit to the second working state, the working state of the phase-shifted full-bridge circuit is switched.

To alleviate or avoid an unstable output voltage of the phase-shifted full-bridge circuit due to switching of the working state of the phase-shifted full-bridge circuit, after determining to switch (or change) the working state of the phase-shifted full-bridge circuit, the controller 200 may stop sending turn-on drive signals to the first high-side switch, the first low-side switch, the second high-side switch, and the second low-side switch, so that the phase-shifted full-bridge circuit stops running in the current working state, that is, stop controlling the first leg and the second leg. After preset duration, the controller 200 sends the turn-on drive signals to the first high-side switch, the first low-side switch, the second high-side switch, and the second low-side switch based on a working state after switching, so that the phase-shifted full-bridge circuit runs in a working state after switching. In some scenarios, the preset duration may be a preset quantity of control periods.

For example, when the current working state of the phase-shifted full-bridge circuit is the second working state, and the first current is less than or equal to the first current threshold, the controller 200 may determine to adjust the working state of the phase-shifted full-bridge circuit, so that the phase-shifted full-bridge circuit runs in the first working state. After determining to adjust the working state of the phase-shifted full bridge circuit, the controller 200 stops controlling the first leg and the second leg, and after preset duration, controls the first leg and the second leg, so that the phase-shifted full-bridge circuit runs in the first working state. Therefore, the controller 200 controls the working state of the phase-shifted full-bridge circuit to switch from the second working state to the first working state.

For another example, when the current working state of the phase-shifted full-bridge circuit is the first working state, and the first current is greater than or equal to the second current threshold, the controller 200 may determine to adjust the working state of the phase-shifted full-bridge circuit, so that the phase-shifted full-bridge circuit runs in the second working state. After determining to adjust the working state of the phase-shifted full bridge circuit, the controller 200 stops controlling the first leg and the second leg, and after preset duration, controls the first leg and the second leg, so that the phase-shifted full-bridge circuit runs in the second working state. Therefore, the controller 200 controls the working state of the phase-shifted full-bridge circuit to switch from the first working state to the second working state.

When the controller 200 starts the phase-shifted full-bridge circuit, the phase-shifted full-bridge circuit may run in the first working state or the second working state. For example, when the controller 200 starts the phase-shifted full-bridge circuit to provide electric energy to the load circuit, the controller 200 may control the phase-shifted full-bridge circuit to run in the second working state. For another example, when the controller 200 starts the phase-shifted full-bridge circuit to provide electric energy to the load circuit, the controller 200 may control the phase-shifted full-bridge circuit to run in the first working state. The phase-shifted full-bridge circuit may implement a soft start. In other words, when the phase-shifted full bridge is started, soft switching is ensured.

Figure 6:
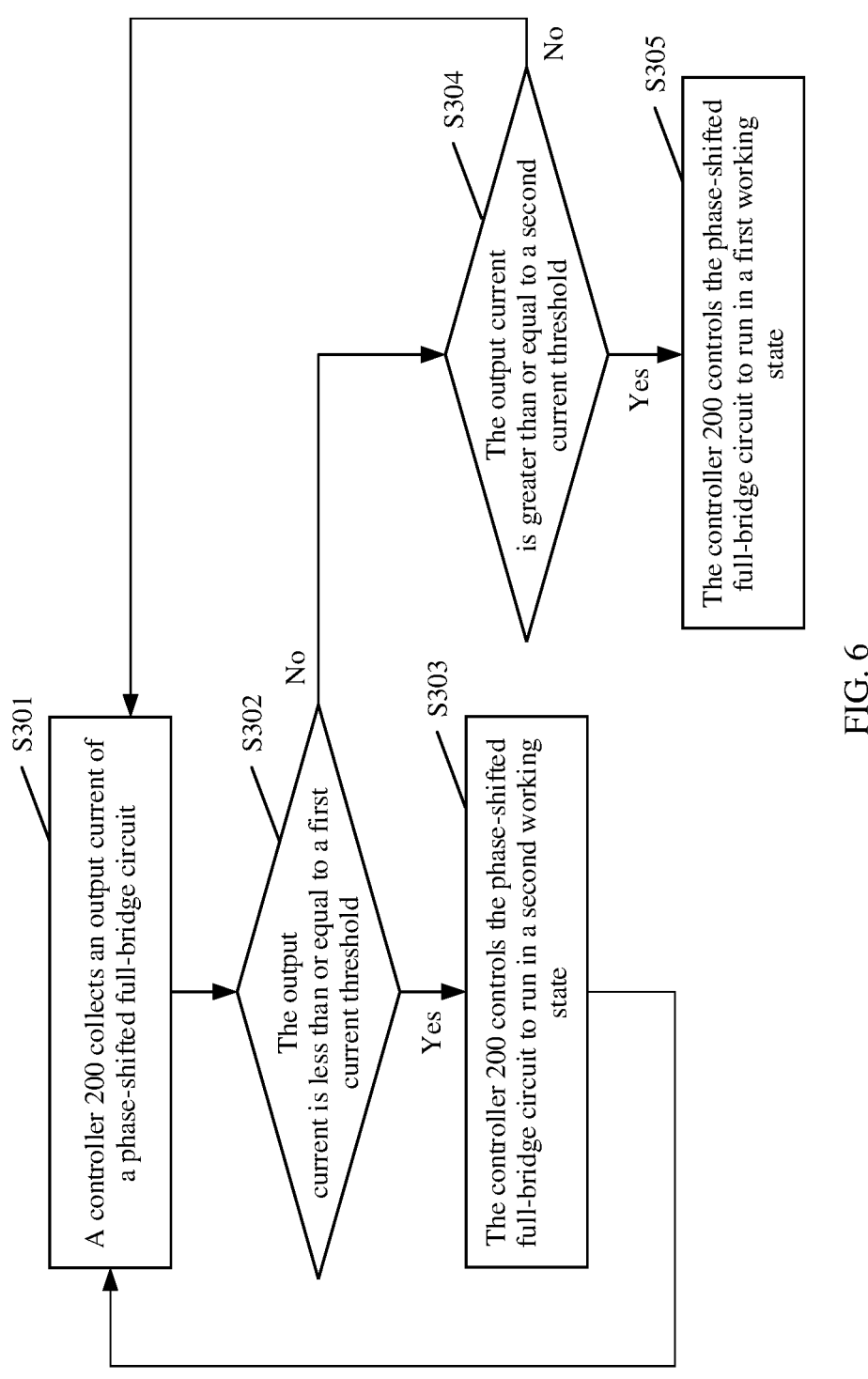
FIG. 6 is a schematic flowchart of a method for controlling a phase-shifted full-bridge circuit according to an embodiment.

To facilitate understanding of functions of the controller 200, FIG. 6 shows a method for controlling a phase-shifted full-bridge circuit according to an example embodiment. The method may include the following steps. The controller 200 may perform one or more steps.

Step S301: The controller 200 collects an output current of a phase-shifted full-bridge circuit.

Step S302: The controller 200 determines whether the output current is less than or equal to a first current threshold; and if the output current is less than or equal to the first current threshold, performs step S303; or if the output current is greater than the first current threshold, performs step S304.

Step S303: The controller 200 controls the phase-shifted full-bridge circuit to run in a second working state.

Step S304: The controller 200 determines whether the output current is greater than or equal to a second current threshold; and if the output current is greater than or equal to the second current threshold, performs step S305; or if the output current is less than the second current threshold, performs step S301 after preset duration.

Step S305: The controller 200 controls the phase-shifted full-bridge circuit to run in a first working state.

The controller 200 may control a first leg and a second leg by providing a drive signal to each switch of each leg. In some examples, the controller 200 may include a drive terminal (or a drive circuit) configured to provide drive signals to the first high-side switch Q1, the first low-side switch Q2, the second high-side switch Q3, and the second low-side switch Q4. The drive signal sent by the controller 200 to the switch may include a turn-on level and a turn-off level. The switch is in an on state under drive of the turn-on level, and the switch is in an off state under drive of the turn-off level. In the drive signals sent by the controller 200, a part whose level is the turn-on level is denoted as a turn-on drive signal, and a part whose level is the turn-off level may be denoted as a turn-off drive signal. In some scenarios, the controller 200 may drive the switch to be off without providing a level to the switch. In the drive signal of the switch, a moment (or a short period of time) when a level of a signal is switched from the turn-off level to the turn-on level may be referred to as a rising edge of the signal. A moment (or a short period of time) when the level of the signal is switched from the turn-on level to the turn-off level may be referred to as a falling edge of the signal. Duration in which the switch is turned on under drive of the turn-on level and continuously maintains an on state may be denoted as turn-on duration of the switch. An interval may mean a part between a first moment and a second moment.

In some application scenarios, the turn-on level of the switch is greater than the turn-off level, in other words, a high level drives the switch to be turned on, and a low level drives the switch to be turned off. In some other application scenarios, the turn-on level of the switch is less than the turn-off level, in other words, the low level drives the switch to be turned on, and the high level drives the switch to be turned off. The following uses an example in which the controller 200 provides a high level to the switch to drive the switch to be turned on, provides a low level to the switch to drive the switch to be turned off, or does not provide a low level to the switch.

The controller 200 may provide a drive signal S1 to the first high-side switch Q1 of the first leg 100 and a drive signal S2 to the first low-side switch Q2 of the first leg 100. The drive signal S2 and the drive signal S1 are complementary. In other words, when a level of the drive signal S1 is a high level, a level of the drive signal S2 is a low level; or when a level of the drive signal S2 is high, a level of the drive signal S1 is low. In other words, the drive signal S1 and the drive signal S2 do not in a high level or a low level at the same time. In addition, the first high-side switch Q1 and the first low-side switch Q2 are not turned on at the same time. In some scenarios, a dead zone may be set in the drive signal S1 and the drive signal S2.

The controller 200 may provide a drive signal S3 to the second high-side switch Q3 of the second leg 101 and may provide a drive signal S4 to the second low-side switch Q4 of the second leg 101. The drive signal S4 and the drive signal S3 are complementary. In other words, when a level of the drive signal S3 is a high level, a level of the drive signal S4 is a low level; or when the level of the drive signal S4 is high, the level of the drive signal S3 is low. In other words, the drive signal S3 and the drive signal S4 do not in a high level or a low level at the same time. In addition, the second high-side switch Q3 the second low-side switch Q4 are not turned on at the same time. In some scenarios, a dead zone may be set in the drive signal S3 and the drive signal S4.

The drive signal S1, the drive signal S2, the drive signal S3, and the drive signal S4 are all periodic signals, and signal frequencies are all drive frequencies.

In this embodiment, the controller 200 may adjust the drive signal sent to each switch of each leg, to change the working state of the phase-shifted full-bridge circuit. For example, the controller 200 may adjust a phase angle and a sequence between the turn-on drive signals sent to the first high-side switch Q1 and the second low-side switch Q4, and adjust a phase angle and a sequence between the turn-on drive signals sent to the first low-side switch Q2 and the second high-side switch Q3, to control the phase-shifted full-bridge circuit to switch the working state.

Figure 7:
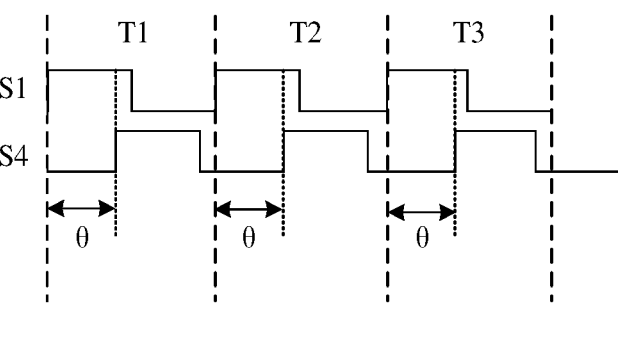
FIG. 7 is a schematic diagram of a phase angle.

In one control period (T), as shown in FIG. 7, a phase corresponding to a moment at which the level of the drive signal S1 provided to the first high-side switch Q1 is switched from a turn-off level to a turn-on level is denoted as a first phase. A phase corresponding to a moment at which the level of the drive signal S4 provided to the second low-side switch Q4 is switched from a turn-off level to a turn-on level is denoted as a second phase. The first phase is also a phase corresponding to a rising edge of the drive signal S1 in one control period, and the second phase is also a phase corresponding to a rising edge of the drive signal S4 in one control period. A part (a difference between the first phase and the second phase) between the first phase and the second phase may be referred to as a phase angle between the turn-on drive signals sent to the first high-side switch Q1 and the second low-side switch Q4.

Similarly, a phase corresponding to a moment at which the level of the drive signal S2 provided to the first low-side switch Q2 is switched from a turn-off level to a turn-on level is denoted as a third phase. A phase corresponding to a moment at which the level of the drive signal S3 provided to the second high-side switch Q3 is switched from a turn-off level to a turn-on level is denoted as a fourth phase. The third phase is also a phase corresponding to a rising edge of the drive signal S2 in one control period, and the fourth phase is also a phase corresponding to a rising edge of the drive signal S3 in one control period. A part (a difference between the third phase and the fourth phase) between the third phase and the fourth phase may be referred to as a phase angle between the turn-on drive signals sent to the first low-side switch Q2 and the second high-side switch Q3.

The phase angle between the turn-on drive signals sent to the first high-side switch Q1 and the second low-side switch Q4 may be the same as the phase angle between the turn-on drive signals sent to the first low-side switch Q2 and the second high-side switch Q3. For ease of description, the phase angle between the turn-on drive signals sent to the first high-side switch Q1 and the second low-side switch Q4 is denoted as a first phase angle. It should be noted that the phase angle between the turn-on drive signals sent to the first low-side switch Q2 and the second high-side switch Q3 is the same as the first phase angle.

The controller 200 may adjust the first phase angle to be greater than 0° and less than or equal to 180°; and control the first high-side switch Q1 to be turned on before the second low-side switch Q4, and the second high-side switch Q3 to be turned on before the first low-side switch Q2, so that the phase-shifted full-bridge circuit runs in the first working state. Alternatively, the controller 200 may control the first high-side switch Q1 to be turned on after the second low-side switch Q4, and the second high-side switch Q3 to be turned on after the first low-side switch Q2, so that the phase-shifted full-bridge circuit runs in the second working state.

The controller 200 is configured to: adjust the first phase angle to be greater than 180° and less than or equal to 360°; and control the first high-side switch Q1 to be turned on before the second low-side switch Q4, and the second high-side switch Q3 to be turned on before the first low-side switch Q2, so that the phase-shifted full-bridge circuit runs in the second working state; or control the first high-side switch Q1 to be turned on after the second low-side switch Q4, and the second high-side switch Q3 to be turned on after the first low-side switch Q2, so that the phase-shifted full-bridge circuit runs in the first working state.

It can be understood from the foregoing descriptions that when a sequence to turn on the switches is fixed, the controller adjusts the first phase angle to adjust the working state of the phase-shifted full-bridge circuit. Alternatively, when the first phase angles are in a same angle range, the controller 200 may adjust the sequence to turn on the switches, to adjust the working state of the phase-shifted full-bridge circuit. The following provides descriptions by using examples.

The following first describes a case in which when the sequence to turn on the switches is fixed, the controller adjusts the phase angle to adjust the working state of the phase-shifted full-bridge circuit. In this implementation, an adjustment range of the first phase angle may be (0°, 360°). When the first high-side switch is turned on before the second low-side switch, the second high-side switch is turned on before the first low-side switch, and the first phase angle is greater than 0° and less than or equal to 180°, the phase-shifted full-bridge circuit runs in the first working state. When the first phase angle is greater than 180° and less than or equal to 360°, the phase-shifted full-bridge circuit runs in the second working state. The phase-shifted full-bridge circuit may have a wider range of soft switching, and a small loss and good efficiency under both a heavy load and a light load. This improves operation reliability.

Figure 8:
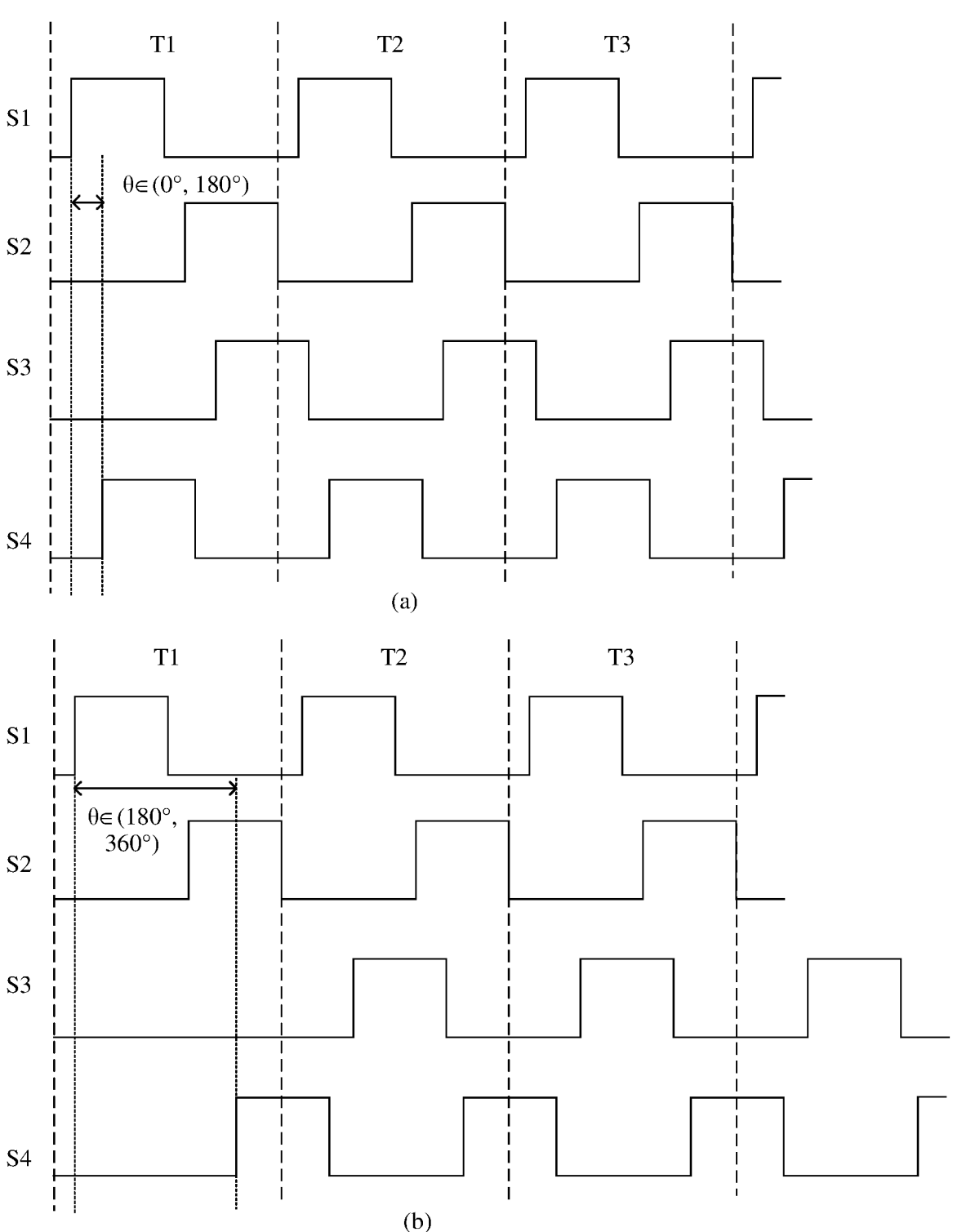
FIG. 8 is a schematic diagram of phase angles corresponding to different working states.

As shown in (a) in FIG. 8, in one period, when the first phase angle is greater than 0° and less than or equal to 180°, the phase-shifted full-bridge circuit runs in the first working state. The controller 200 may adjust the first phase angle in a first angle range, to control the phase-shifted full-bridge circuit to run in the first working state. For example, the first angle range may be (0°, 180°). It can be understood that the controller 200 may adjust the first phase shift angle to be greater than 0° and less than or equal to 180°, to control the phase-shifted full-bridge circuit to run in the first working state.

As shown in (b) in FIG. 8, in each period, when the first phase angle θ is greater than 180° and less than or equal to 360°, the phase-shifted full-bridge circuit runs in the second working state. The controller 200 may adjust the first phase angle in a second angle range, to control the phase-shifted full-bridge circuit to run in the second working state. For example, the second angle range may be (180°, 360°). It can be understood that the controller 200 may adjust the first phase shift angle to be greater than 180° and less than or equal to 360°, to control the phase-shifted full-bridge circuit to run in the second working state.

Similarly, when the first high-side switch is turned on after the second low-side switch, the second high-side switch is turned on after the first low-side switch, and the first phase angle is greater than 0° and less than or equal to 180°, the phase-shifted full-bridge circuit runs in the second working state. When the first phase angle is greater than 180° and less than or equal to 360°, the phase-shifted full-bridge circuit runs in the first working state.

Figure 9:
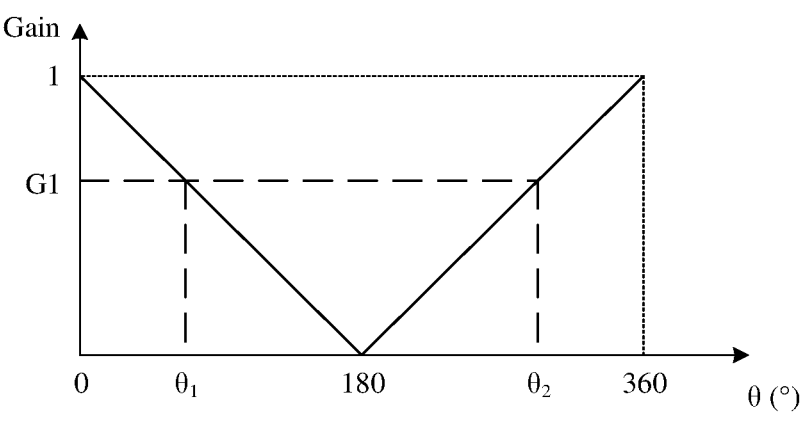
FIG. 9 is a schematic diagram of a relationship between a phase angle and a gain.

FIG. 9 shows a correspondence between the first phase angle and a gain (Gain) according to an example embodiment. With reference to FIG. 9, in the first angle range, a larger first phase angle indicates a smaller gain. A smaller first phase angle indicates a larger gain. In the second angle range, a larger first phase angle indicates a larger gain. A smaller first phase angle indicates a smaller gain. A gain of the phase-shifted full-bridge circuit may not be 0 and one gain may correspond to two phase shift angles, that is, two phase shift angles may correspond to a same gain.

In an example, the controller 200 may determine the first phase angle based on an expected gain. When the controller 200 controls the phase-shifted full-bridge circuit to run in the first working state, the controller 200 may determine, based on the expected gain (for example, G1 in FIG. 9) and the correspondence between the first phase angle and the gain, a phase shift angle corresponding to the expected gain. Therefore, phase shift angles corresponding to the expected gain are separately $\theta_1$ and $\theta_2$. The controller 200 uses (or determines) the phase shift angle corresponding to the expected gain in the first angle range as the first phase angle and adjusts the drive signal sent to each switch of each leg, so that the phase-shifted full-bridge circuit runs in the first working state.

In another example, when the controller 200 controls the phase-shifted full-bridge circuit to run in the second working state, the controller 200 may determine, based on the expected gain (for example, a gain 1 in FIG. 9) and the correspondence between the first phase angle and the gain, a phase shift angle corresponding to the expected gain. The expected gain may not be 0. Therefore, phase shift angles corresponding to the expected gain are separately $\theta_1$ and $\theta_2$. The controller 200 uses (or determines) the phase shift angle corresponding to the expected gain in the second angle range as the first phase angle and adjusts the drive signal sent to each switch of each leg, so that the phase-shifted full-bridge circuit runs in the second working state.

Figure 10:
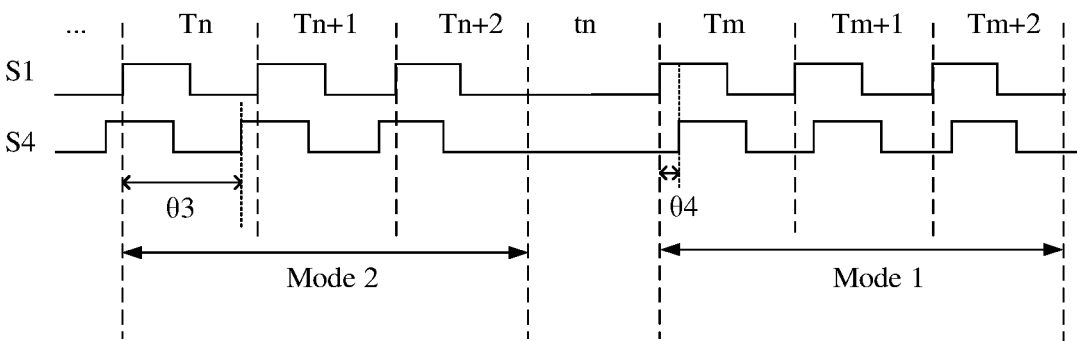
FIG. 10 is a schematic diagram of a waveform of a switch drive signal when a phase-shifted full-bridge circuit switches from a second working state to a first working state.

In an experimental scenario, the controller 200 controls, by using the operation provided in this implementation, the phase-shifted full-bridge circuit to switch from the second working state to the first working state. Waveforms of the drive signal S1 and the drive signal S4 are shown in FIG. 10. The following is described by using an example in which a current control period is a control period n. As shown in FIG. 10, in the control period n, a control period n+1, and a control period n+2, the phase-shifted full-bridge circuit runs in the second working state (mode 2), the first phase angle is θ3, and θ3 is greater than 180°. The controller 200 may switch, based on load, the working state of the phase-shifted full-bridge circuit to the first working state (mode 1). The controller 200 may stop driving the leg in a preset quantity of control periods after the control period n+2, and a level of each drive signal of the controller 200 in the preset quantity of control periods (tn) may be a low level. Alternatively, the controller 200 does not send a drive signal to each switch in the preset quantity of control periods. It is assumed that a control period after the preset quantity of control periods is a control period m. In the control period m, a control period m+1, and a control period m+2, the phase-shifted full-bridge circuit runs in the first working state, the first phase angle is θ4, and θ4 is less than 180°.

Figure 11:
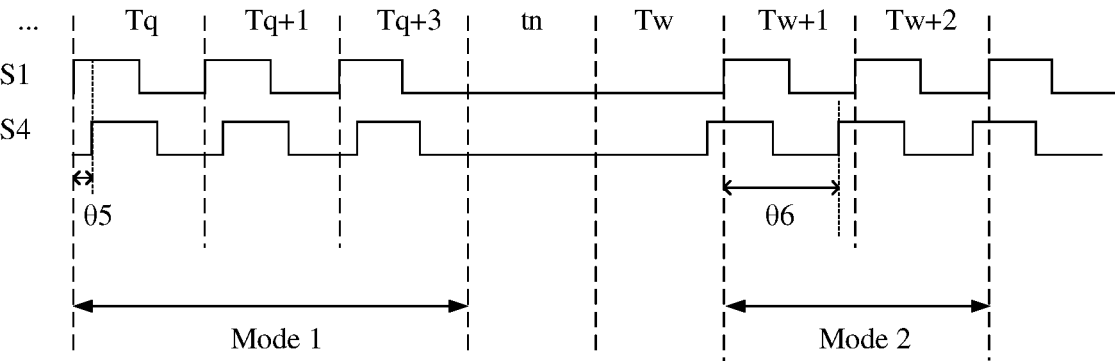
FIG. 11 is a schematic diagram of a waveform of a switch drive signal when a phase-shifted full-bridge circuit switches from a first working state to a second working state.

In another experimental scenario, the controller 200 controls, by using the operation provided in this implementation, the first leg and the second leg to switch from the first working state to the second working state. Waveforms of the drive signal S1 and the drive signal S4 are shown in FIG. 11. The following is described by using an example in which a current control period is a control period q. As shown in FIG. 11, in the control period q, a control period q+1, and a control period q+2, the phase-shifted full-bridge circuit runs in the first working state (mode 1), the first phase angle is θ5, and θ5 is less than 180°. The controller 200 may switch, based on load of the secondary-side circuit, the working state of the phase-shifted full-bridge circuit to the second working state. The controller 200 may stop driving the leg in a preset quantity of control periods after the control period q+2, and a level of each drive signal of the controller 200 in the preset quantity of control periods may be a low level. Alternatively, the controller 200 does not send a drive signal to each switch in the preset quantity of control periods. It is assumed that a control period after the preset quantity of control periods is a control period w. In the control period w, a control period w+1, and a control period w+2, the phase-shifted full-bridge circuit runs in the second working state, the first phase angle is θ6, and θ6 is greater than 180°.

The following describes a case in which when the first phase angles are in a same angle range, the controller 200 may adjust the sequence to turn on the switches, to adjust the working state of the phase-shifted full-bridge circuit. The phase-shifted full-bridge circuit may have a wider range of soft switching, and a small loss and good efficiency under both a heavy load and a light load. This improves operation reliability.

When the first phase angles are in a same angle range, the controller 200 may adjust configuration of the drive signal sent to each switch of each leg, that is, adjust wave sending configuration, for example, a moment to send a wave, to adjust the working state of the phase-shifted full-bridge circuit. The drive signal S1 and the drive signal S4 may have a same waveform and may be sent at different moments. The drive signal S2 and the drive signal S3 may have a same waveform and may be sent at different moments. In an actual application scenario, the drive signal S1 and the drive signal 2 are complementary, and the drive signal S3 and the drive signal S4 are complementary.

The controller 200 may adjust the first phase angle to be greater than 0° and less than or equal to 180°, adjust a sequence to provide the turn-on drive signals to the first high-side switch Q1 and the second low-side switch Q4, adjust a sequence to provide the turn-on drive signals to the second high-side switch Q3 and the first low-side switch Q2. When the first high-side switch is turned on before the second low-side switch, and the second high-side switch is turned on before the first low-side switch, the phase-shifted full-bridge circuit runs in the first working state. When the first high-side switch is turned on after the second low-side switch, and the second high-side switch is turned on after the first low-side switch, the phase-shifted full-bridge circuit runs in the second working state.

In a possible case, the controller 200 may first provide the turn-on drive signal to the first high-side switch Q1, and after target duration (a phase angle corresponding to the target duration in one period is the phase angle between the turn-on drive signals sent to the first high-side switch and the second low-side switch), provide the turn-on drive signal to the second low-side switch Q4. The controller 200 may provide the turn-on drive signal to the first low-side switch Q2, and after duration t2, provide the turn-on drive signal to the second high-side switch Q3. Therefore, the controller controls the phase-shifted full-bridge circuit to run in the first working state. The first high-side switch Q1 and the first low-side switch Q2 are not turned on at the same time, and the second high-side switch Q3 and the second low-side switch Q4 are not turned on at the same time.

Figure 12:
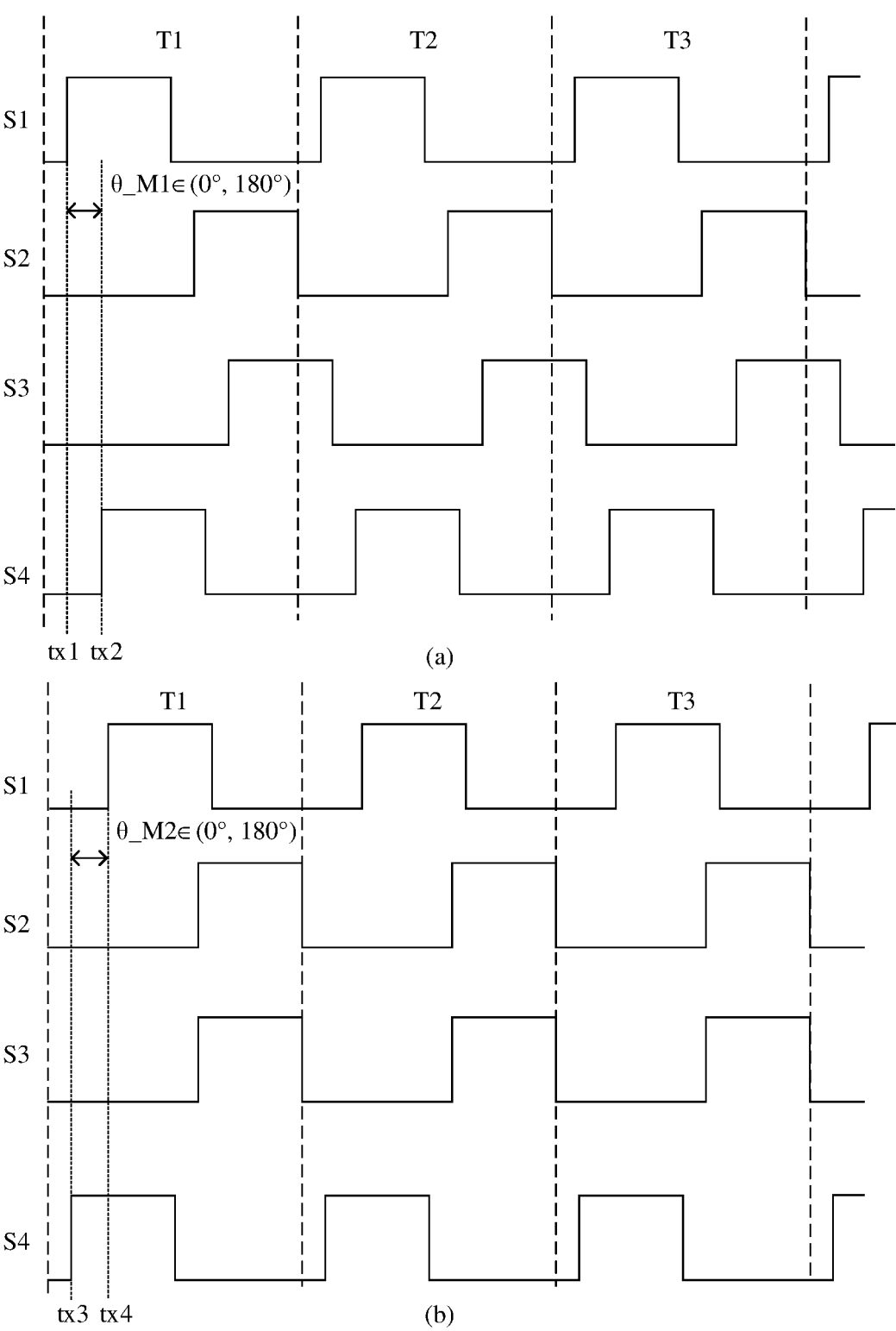
FIG. 12 is a schematic diagram of phase shift angles in different working states.

As shown in (a) in FIG. 12, the controller 200 may provide the drive signal to each switch, and a start moment tx1 of providing the turn-on drive signal to the first high-side switch Q1 is earlier than a moment tx2 of providing the turn-on drive signal to the second low-side switch Q4. In other words, tx1 is earlier than (before) tx2. The target duration is an interval between tx1 and tx2, and the phase angle θ_M1 corresponding to the target duration is greater than 0° and less than or equal to 180°, so that the phase-shifted full-bridge circuit runs in the first working state. For each control period, the start moment tx1 of providing the turn-on drive signal to the first high-side switch Q1 is also a moment of the rising edge of the drive signal S1. The start moment tx2 of providing the turn-on drive signal to the second low-side switch Q4 is also a moment of the rising edge of the drive signal S4. Similarly, the controller 200 may first provide the turn-on drive signal to the second low-side switch Q2, and then provide the turn-on drive signal to the second high-side switch Q3. Details are not described herein again.

In another possible case, the controller 200 may provide the turn-on drive signal to the second low-side switch Q4, and after the target duration, provide the turn-on drive signal to the first high-side switch Q1. The controller 200 may provide the turn-on drive signal to the second high-side switch Q3, and after the duration t2, provide the turn-on drive signal to the first low-side switch Q2. Therefore, the controller controls the phase-shifted full-bridge circuit to run in the second working state.

As shown in (b) in FIG. 12, the controller 200 may provide the drive signal to each switch, and a start moment tx4 of providing the turn-on drive signal to the first high-side switch Q1 is earlier than a start moment tx3 of providing the turn-on drive signal to the second low-side switch Q4. In other words, tx3 is earlier than (before) tx4. The target duration in an interval between tx3 and tx4, and the phase angle θ_M2 corresponding to the target duration is greater than 0° and less than or equal to 180°, so that the phase-shifted full-bridge circuit runs in the second working state. For each control period, the start moment tx4 of providing the turn-on drive signal to the first high-side switch Q1 is also a moment of the rising edge of the drive signal S1. The start moment tx3 of providing the turn-on drive signal to the second low-side switch Q4 is also a moment of the rising edge of the drive signal S4. Similarly, the controller 200 may first provide the turn-on drive signal to the second low-side switch Q2, and then provide the turn-on drive signal to the second high-side switch Q3. Details are not described herein again.

It can be understood from the foregoing descriptions that in this implementation, adjustment ranges of the phase angle θ_M1 and the phase angle θ_M2 are a third angle range. In some examples, the controller 200 may determine the phase shift angle θ_M1 based on an expected gain. When the controller 200 controls the phase-shifted full-bridge circuit to run in the first working state, the controller 200 may determine, based on the expected gain and the preset correspondence between the phase shift angle and the gain, a phase shift angle corresponding to the expected gain, use the phase shift angle corresponding to the expected gain as the phase angle θ_M1, and adjust the drive signal sent to each switch of each leg, so that the phase-shifted full-bridge circuit runs in the first working state.

In some other examples, the controller 200 may determine the phase angle θ_M2 based on an expected gain. When the controller 200 controls the phase-shifted full-bridge circuit to run in the second working state, the controller 200 may determine, based on the expected gain and the preset correspondence between the phase shift angle and the gain, a phase shift angle corresponding to the expected gain, use the phase angle corresponding to the expected gain as the phase angle θ_M2, and adjust the drive signal sent to each switch of each leg, so that the phase-shifted full-bridge circuit runs in the second working state.

Similarly, the controller 200 may adjust the first phase angle to be greater than 180° and less than or equal to 360°, adjust a sequence to provide the turn-on drive signals to the first high-side switch Q1 and the second low-side switch Q4, adjust a sequence to provide the turn-on drive signals to the second high-side switch Q3 and the first low-side switch Q2. When the first high-side switch is turned on before the second low-side switch, and the second high-side switch is turned on before the first low-side switch, the phase-shifted full-bridge circuit runs in the second working state. When the first high-side switch is turned on after the second low-side switch, and the second high-side switch is turned on after the first low-side switch, the phase-shifted full-bridge circuit runs in the first working state.

Figures 13, 14:
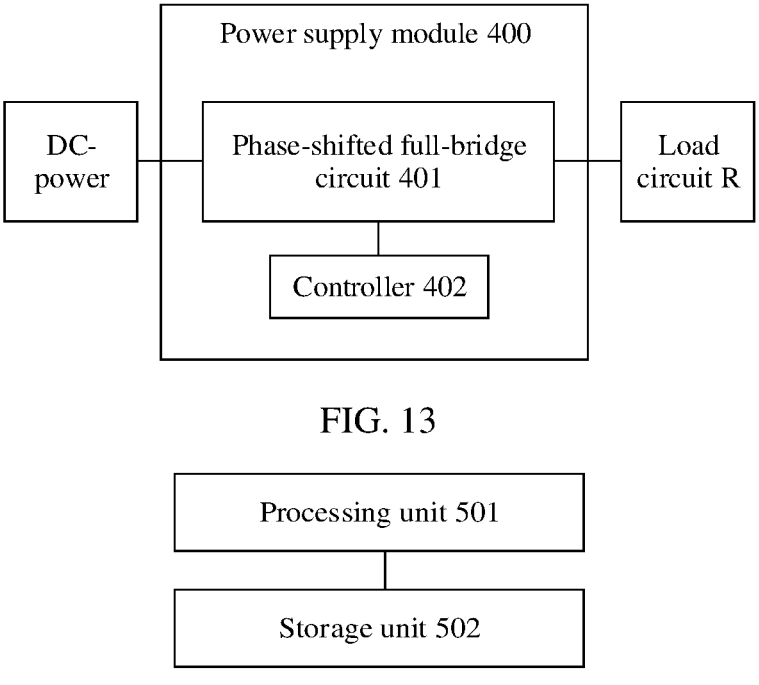
FIG. 13 is a schematic diagram of a structure of a power supply model according to an embodiment.
FIG. 14 is a schematic diagram of a structure of a controller according to an embodiment.

According to the phase-shifted full-bridge circuit and the controller for controlling the phase-shifted full-bridge circuit provided in any one of the foregoing embodiments, an embodiment may further provide a power supply module. FIG. 13 is a schematic diagram of a structure of a power supply module according to an example embodiment. A power supply module 400 may include a phase-shifted full-bridge circuit 401 and a controller 402. The phase-shifted full-bridge circuit 401 may be any phase-shifted full-bridge circuit in the foregoing embodiments. This is not limited in this embodiment. The phase-shifted full-bridge circuit 401 may be coupled to a direct current power supply DC-power and to load R. For connection relationships between the phase-shifted full-bridge circuit 401 and the coupled direct current power supply DC-power and between the phase-shifted full-bridge circuit 401 and the coupled load R, refer to related descriptions in the foregoing embodiments. Details are not described herein again.

The controller 402 may have functions of the controller 200 or may perform all or some operations performed by the controller 200. The controller 402 may be a chip or a circuit, for example, a chip or a circuit disposed in the power supply module.

In a possible implementation, the controller 402 may be the controller 200. In another possible implementation, the controller 402 is configured to control, based on a load level of a load circuit, the phase-shifted full-bridge circuit to switch a working state. The controller 402 may include: a detection terminal, where the detection terminal is configured to detect the load level of the load circuit; and a drive terminal, where the drive terminal is configured to send turn-on drive signals to a first high-side switch and a first low-side switch of a first leg, and a second high-side switch and a second low-side switch of a second leg. The controller is configured to adjust, based on the load level detected by the detection terminal, the drive signals output by the drive terminal, to control the phase-shifted full-bridge circuit to run in a first working state or a second working state.

The load level of the load circuit of the power supply module may include a light load and a heavy load. In response to switching the load level from the light load to the heavy load, the controller 402 may control the phase-shifted full-bridge circuit to switch from the second working state to the first working state. In response to switching the load level from the heavy load to the light load, the controller 402 may control the phase-shifted full-bridge circuit to switch from the first working state to the second working state.

When detecting the load level of the load circuit, the detection terminal of the controller 402 may be configured to: detect the load level based on a comparison result between an output current of the phase-shifted full-bridge circuit and a preset first current threshold or a preset second current threshold, and the second current threshold is greater than the first current threshold. When the output current is less than or equal to the first current threshold, the load level is a light load. When the output current is greater than or equal to the second current threshold, the load level is a heavy load.

When controlling the phase-shifted full-bridge circuit to switch the working state, the controller 402 may be configured to: adjust a phase angle and a sequence between the turn-on drive signals sent to the first high-side switch and the second low-side switch, and adjust a phase angle and a sequence between the turn-on drive signals sent to the first low-side switch and the second high-side switch.

The controller 402 may be configured to: adjust the phase angle to be greater than 0° and less than or equal to 180°, and control the first high-side switch to be turned on before the second low-side switch, and the second high-side switch to be turned on before the first low-side switch, so that the phase-shifted full-bridge circuit runs in the first working state; or adjust the phase angle to be greater than 0° and less than or equal to 180°, and control the first high-side switch to be turned on after the second low-side switch, and the second high-side switch to be turned on after the first low-side switch, so that the phase-shifted full-bridge circuit runs in the second working state.

The controller 402 may be configured to: adjust the phase angle to be greater than 180° and less than or equal to 360°, and control the first high-side switch to be turned on before the second low-side switch, and the second high-side switch to be turned on before the first low-side switch, so that the phase-shifted full-bridge circuit runs in the second working state; or adjust the phase angle to be greater than 180° and less than or equal to 360°, and control the first high-side switch to be turned on after the second low-side switch, and the second high-side switch to be turned on after the first low-side switch, so that the phase-shifted full-bridge circuit runs in the first working state.

When controlling the phase-shifted full-bridge circuit to switch the working state, the controller 402 may be configured to: stop sending turn-on drive signals to the first high-side switch, the first low-side switch, the second high-side switch, and the second low-side switch; and after preset duration, send the turn-on drive signals to the first high-side switch, the first low-side switch, the second high-side switch, and the second low-side switch based on a working state after switching.

FIG. 14 shows a schematic diagram of a structure of the controller 402 or the controller 200. The controller may include a processing unit 501 and a storage unit 502. The storage unit 502 may be configured to store instructions (code or a program) and/or data and may include a memory. The processing unit 501 may read the instructions (code or a program) and/or data in the memory, to implement the functions of the controller 200, or perform all or some operations performed by the controller 200.

It should be understood that the processing unit 501 may be a chip. For example, the processor may be a field programmable gate array (FPGA), an application-specific integrated chip (ASIC), a system on chip (SoC), a central processing unit (CPU), a network processor (NP), a digital signal processor (DSP), a micro controller unit (MCU), a programmable controller (PLD), or another integrated chip.

In an implementation process, steps in the methods can be implemented by using a hardware integrated logical circuit in the processor, or by using instructions in a form of software. The steps of the methods with reference to embodiments may be directly executed and accomplished by a hardware processor or may be executed and accomplished by using a combination of hardware and software modules in the processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the methods in combination with hardware of the processor.

It should be noted that the processing unit 501 may be an integrated circuit chip and has a signal processing capability. In an implementation process, steps in the method embodiments can be implemented by using a hardware-integrated logical circuit in the processor, or by using instructions in a form of software. The processor may alternatively be a general-purpose processor, a digital signal processor (DSP), an application-specific integrated circuit (ASIC), a field programmable gate array (FPGA) or another programmable logic device, a discrete gate or a transistor logic device, a discrete hardware component, or the like. It may implement or perform the methods, the steps, and logical block diagrams that are in the embodiments. The general-purpose processor may be a microprocessor, or the processor may be any conventional processor or the like. Steps of the methods with reference to the embodiments may be directly executed and accomplished by using a hardware decoding processor or may be executed and accomplished by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the methods in combination with hardware of the processor.

It may be understood that the memory in the embodiments may be a volatile memory or a nonvolatile memory or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EE-PROM), or a flash memory. The volatile memory may be a random access memory (RAM), used as an external cache. Through example but not limitative description, a plurality of forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the system and method described in this specification include, but are not limited to, these memories and any memory of another suitable type.

It should be understood that the processor may be a chip, and the processor in the controller may be implemented by using hardware or by using software. When implemented by using hardware, the processor may be a logic circuit, an integrated circuit, or the like. When the implemented by using software, the processor may be a general-purpose processor, and is implemented by reading software code stored in the memory. The memory may be integrated into the processor, may be located outside the processor, or may exist independently.

In addition, an embodiment may further provide an electronic device, including the controller in any one of the foregoing embodiments, or the power supply module in any one of the foregoing embodiments.

An embodiment may further provide a computer program product, including program instructions or code. When the program instructions are run on a processor or a controller, the program instructions are used to enable the processor or the controller to perform all or some of the described steps performed by the controller 200 based on various example implementations.

An embodiment may further provide a non-transitory storage medium that stores the computer program product. The non-transitory storage medium provided in this embodiment may be, but is not limited to, an electrical, a magnetic, an optical, an electromagnetic, an infrared, or a semiconductor system, apparatus or device, or any combination thereof. A non-exhaustive list of non-transitory storage media may include: an electrical connection having one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage component, a magnetic storage component, or any appropriate combination thereof.

It is clear that a person skilled in the art can make various modifications and variations without departing from the scope of the embodiments and equivalent technologies.

The invention claimed is:

1. A controller for controlling a phase-shifted full-bridge circuit, wherein the phase-shifted full-bridge circuit comprises a first leg and a second leg, the first leg comprises a first high-side switch and a first low-side switch, the second leg comprises a second high-side switch and a second low-side switch, a working state of the phase-shifted full-bridge circuit comprises a first working state and a second working state, and the controller is configured to:

detect a load level of a load circuit coupled to the phase-shifted full-bridge circuit; and control, based on the load level, the phase-shifted full-bridge circuit to switch the working state, wherein, when the phase-shifted full-bridge circuit runs in the first working state, the first leg is a leading leg, and the second leg is a lagging leg; or when the phase-shifted full-bridge circuit runs in the second working state, the first leg is a lagging leg, and the second leg is a leading leg;

detect the load level based on a comparison result between an output current of the phase-shifted full-bridge circuit and a first current threshold or a second current threshold, wherein the second current threshold is greater than the first current threshold;

in response to that the output current is less than or equal to the first current threshold, and the load level detected by the controller is a light load, the controller controls the phase-shifted full-bridge circuit to run in the second working state; or in response to that the output current is greater than or equal to the second current threshold, and the load level detected by the controller is a heavy load, the controller controls the phase-shifted full-bridge circuit to run in the first working state.

2. The controller according to claim 1, wherein, when controlling, based on the load level, the phase-shifted full-bridge circuit to switch the working state, the controller is further configured to:

when the load level is a heavy load, and a current working state of the phase-shifted full-bridge circuit is the second working state, switch the working state of the phase-shifted full-bridge circuit to the first working state; or when the load level is a light load, and a current working state of the phase-shifted full-bridge circuit is the first working state, switch the working state of the phase-shifted full-bridge circuit to the second working state.

3. The controller according to claim 1, wherein, when controlling the phase-shifted full-bridge circuit to switch the working state, the controller is further configured to:

stop sending turn-on drive signals to the first high-side switch, the first low-side switch, the second high-side switch, and the second low-side switch, so that the phase-shifted full-bridge circuit stops running in the current working state; and after a preset duration, send the turn-on drive signals to the first high-side switch, the first low-side switch, the second high-side switch, and the second low-side switch based on a working state after switching.

4. The controller according to claim 1, wherein, when controlling the phase-shifted full-bridge circuit to switch the working state, the controller is further configured to:

adjust a phase angle and a sequence between the turn-on drive signals sent to the first high-side switch and the second low-side switch, and adjust a phase angle and a sequence between the turn-on drive signals sent to the first low-side switch and the second high-side switch.

5. The controller according to claim 4, wherein the controller is further configured to:

adjust the phase angle to be greater than 0° and less than or equal to 180°; and control the first high-side switch to be turned on before the second low-side switch, and the second high-side switch to be turned on before the first low-side switch, so that the phase-shifted full-bridge circuit runs in the first working state; or control the first high-side switch to be turned on after the second low-side switch, and the second high-side switch to be turned on after the first low-side switch, so that the phase-shifted full-bridge circuit runs in the second working state.

6. The controller according to claim 4, wherein the controller is further configured to:

adjust the phase angle to be greater than 180° and less than or equal to 360°; and control the first high-side switch to be turned on before the second low-side switch, and the second high-side switch to be turned on before the first low-side switch, so that the phase-shifted full-bridge circuit runs in the second working state; or control the first high-side switch to be turned on after the second low-side switch, and the second high-side switch to be turned on after the first low-side switch, so that the phase-shifted full-bridge circuit runs in the first working state.

7. A power supply module, comprising a phase-shifted full-bridge circuit and a controller, wherein the phase-shifted full-bridge circuit comprises a first leg and a second leg, the first leg comprises a first high-side switch and a first low-side switch, the second leg comprises a second high-side switch and a second low-side switch, and the controller is configured to control the phase-shifted full-bridge circuit to supply power to a load circuit of the power supply module;

a working state of the phase-shifted full-bridge circuit comprises a first working state and a second working state; and when the phase-shifted full-bridge circuit runs in the first working state, the first leg is a leading leg, and the second leg is a lagging leg; or when the phase-shifted full-bridge circuit runs in the second working state, the first leg is a lagging leg, and the second leg is a leading leg; and the controller is configured to control, based on a load level of the load circuit, the phase-shifted full-bridge circuit to switch the working state; and the controller comprises:

a detection terminal, wherein the detection terminal is configured to detect the load level of the load circuit; and a drive terminal, wherein the drive terminal is configured to send turn-on drive signals to the first high-side switch and the first low-side switch of the first leg, and the second high-side switch and the second low-side switch of the second leg, wherein the controller is configured to adjust, based on the load level detected by the detection terminal, the drive signals output by the drive terminal, to control the phase-shifted full-bridge circuit to run in the first working state or the second working state;

the load level comprises a light load and a heavy load, when detecting the load level of the load circuit, the detection terminal of the controller is further configured to:

detect the load level based on a comparison result between an output current of the phase-shifted full-bridge circuit and a preset first current threshold or a preset second current threshold, wherein the second current threshold is greater than the first current threshold, wherein, when the output current is less than or equal to the first current threshold, the load level is the light load; or when the output current is greater than or equal to the second current threshold, the load level is the heavy load.

8. The power supply module according to claim 7, wherein the load level of the load circuit of the power supply module comprises a light load and a heavy load;

in response to switching the load level from the light load to the heavy load, the controller controls the phase-shifted full-bridge circuit to switch from the second working state to the first working state; and in response to switching the load level from the heavy load to the light load, the controller controls the phase-shifted full-bridge circuit to switch from the first working state to the second working state.

9. The power supply module according to claim 7, wherein, when controlling the phase-shifted full-bridge circuit to switch the working state, the controller is further configured to:

adjust a phase angle and a sequence between the turn-on drive signals sent to the first high-side switch and the second low-side switch; and adjust a phase angle and a sequence between the turn-on drive signals sent to the first low-side switch and the second high-side switch.

10. The power supply module according to claim 9, wherein the controller is further configured to:

adjust the phase angle to be greater than 0° and less than or equal to 180°, and control the first high-side switch to be turned on before the second low-side switch, and the second high-side switch to be turned on before the first low-side switch, so that the phase-shifted full-bridge circuit runs in the first working state; or adjust the phase angle to be greater than 0° and less than or equal to 180°, and control the first high-side switch to be turned on after the second low-side switch, and the second high-side switch to be turned on after the first low-side switch, so that the phase-shifted full-bridge circuit runs in the second working state.

11. The power supply module according to claim 9, wherein the controller is further configured to:

adjust the phase angle to be greater than 180° and less than or equal to 360°, and control the first high-side switch to be turned on before the second low-side switch, and the second high-side switch to be turned on before the first low-side switch, so that the phase-shifted full-bridge circuit runs in the second working state; or adjust the phase angle to be greater than 180° and less than or equal to 360°, and control the first high-side switch to be turned on after the second low-side switch, and the second high-side switch to be turned on after the first low-side switch, so that the phase-shifted full-bridge circuit runs in the first working state.

12. The power supply module according to claim 7, wherein, when controlling the phase-shifted full-bridge circuit to switch the working state, the controller is further configured to:

stop sending the turn-on drive signals to the first high-side switch, the first low-side switch, the second high-side switch, and the second low-side switch; and after a preset duration, send the turn-on drive signals to the first high-side switch, the first low-side switch, the second high-side switch, and the second low-side switch based on a working state after switching.

13. An electronic device, wherein the electronic device comprises a phase-shifted full-bridge circuit and a controller for controlling a phase-shifted full-bridge circuit, wherein the phase-shifted full-bridge circuit comprises a first leg and a second leg, the first leg comprises a first high-side switch and a first low-side switch, the second leg comprises a second high-side switch and a second low-side switch, a working state of the phase-shifted full-bridge circuit comprises a first working state and a second working state, and the controller is configured to:

detect a load level of a load circuit coupled to the phase-shifted full-bridge circuit; and control, based on the load level, the phase-shifted full-bridge circuit to switch the working state, wherein, when the phase-shifted full-bridge circuit runs in the first working state, the first leg is a leading leg, and the second leg is a lagging leg; or when the phase-shifted full-bridge circuit runs in the second working state, the first leg is a lagging leg, and the second leg is a leading leg;

detect the load level based on a comparison result between an output current of the phase-shifted full-bridge circuit and a first current threshold or a second current threshold, wherein the second current threshold is greater than the first current threshold;

in response to that the output current is less than or equal to the first current threshold, and the load level detected by the controller is a light load, the controller controls the phase-shifted full-bridge circuit to run in the second working state; or in response to that the output current is greater than or equal to the second current threshold, and the load level detected by the controller is a heavy load, the controller controls the phase-shifted full-bridge circuit to run in the first working state.

* * * * *